United States Patent [19]
Albert et al.

[11] Patent Number: 5,490,197
[45] Date of Patent: * Feb. 6, 1996

[54] METHOD AND APPARATUS FOR DIGITAL CONTROL OF SCANNING X-RAY IMAGING SYSTEMS

[76] Inventors: Richard D. Albert; David L. Reyna, both of 2239 Omega Rd., San Ramon, Calif. 94583

[*] Notice: The portion of the term of this patent subsequent to Nov. 30, 2010, has been disclaimed.

[21] Appl. No.: 128,538

[22] Filed: Sep. 29, 1993

Related U.S. Application Data

[63] Continuation-in-part of Ser. No. 959,605, Oct. 13, 1992, Pat. No. 5,267,296.
[51] Int. Cl.$^6$ .................................................. H05G 1/52
[52] U.S. Cl. ........................ 378/113; 378/137; 378/10
[58] Field of Search .................................. 378/10, 19, 62, 378/95, 113, 137, 146

[56] References Cited

U.S. PATENT DOCUMENTS

| | | |
|---|---|---|
| 3,949,229 | 4/1976 | Albert . |
| 4,048,496 | 9/1977 | Albert . |
| 4,144,457 | 3/1979 | Albert . |
| 4,147,935 | 4/1979 | Warrikhoff . |
| 4,149,076 | 4/1979 | Albert . |
| 4,196,351 | 4/1980 | Albert . |
| 4,259,582 | 3/1981 | Albert . |
| 4,323,779 | 4/1982 | Albert . |
| 4,465,540 | 8/1984 | Albert . |
| 4,730,350 | 3/1988 | Albert . |
| 5,267,296 | 11/1993 | Albert ...................................... 378/113 |

Primary Examiner—David P. Porta

[57] ABSTRACT

X-ray images are produced on a monitor display screen by situating the subject between a detector having a minute x-ray sensitive area and an x-ray source having an extensive anode plate on which an x-ray origin point is swept in a raster pattern similar to the raster of the display monitor. Operating parameters of the x-ray source are controlled by digital data processing circuits which enable magnification of operator selected areas of the image by reducing the size of x-ray source raster pattern and repositioning of the raster pattern on the anode plate in response to operator actuation of one or more computer input devices. In the preferred form, the system also enables image enhancements and control of image characteristics such as contrast and brightness in response to actuations of the input devices or in response to programming. X-ray exposure and image acquisition time may be reduced by operator selection of only specific areas of particular interest for high resolution scanning. In the preferred form, the apparatus can detect a particular gray level in the image data and relocate the scan to image the region where the gray level is found. This enables fixed imaging of a moving object.

13 Claims, 11 Drawing Sheets

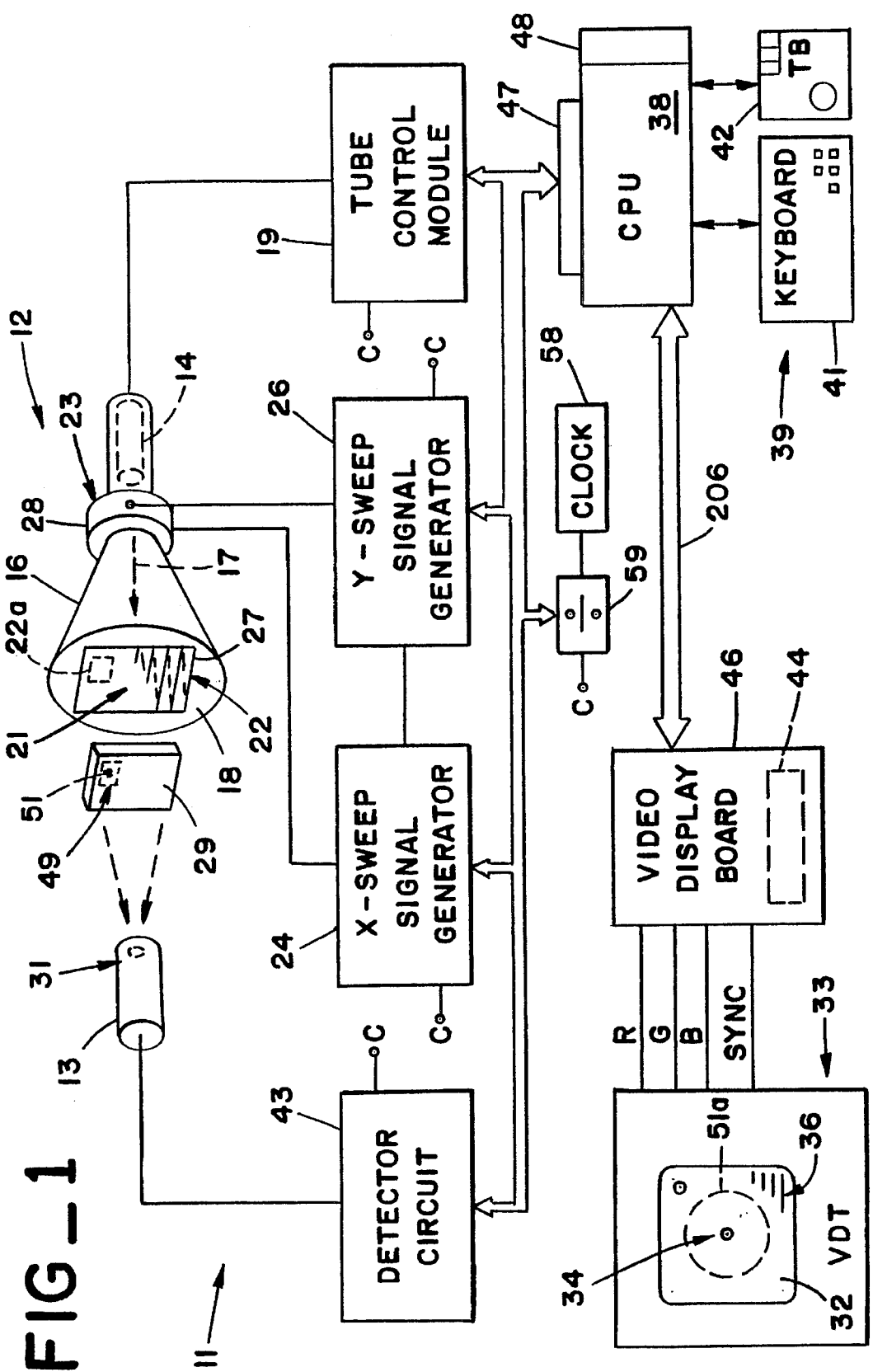

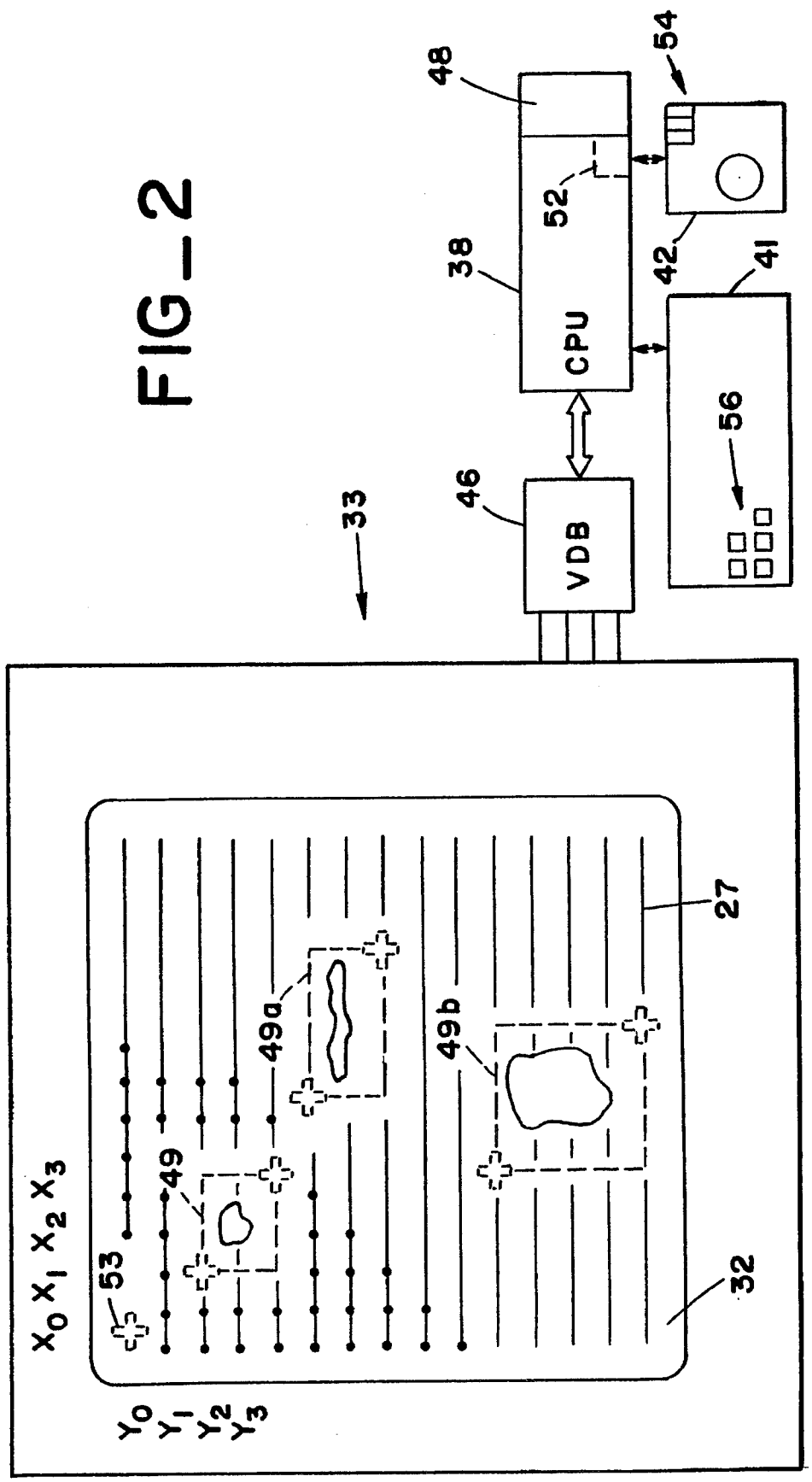
FIG_2

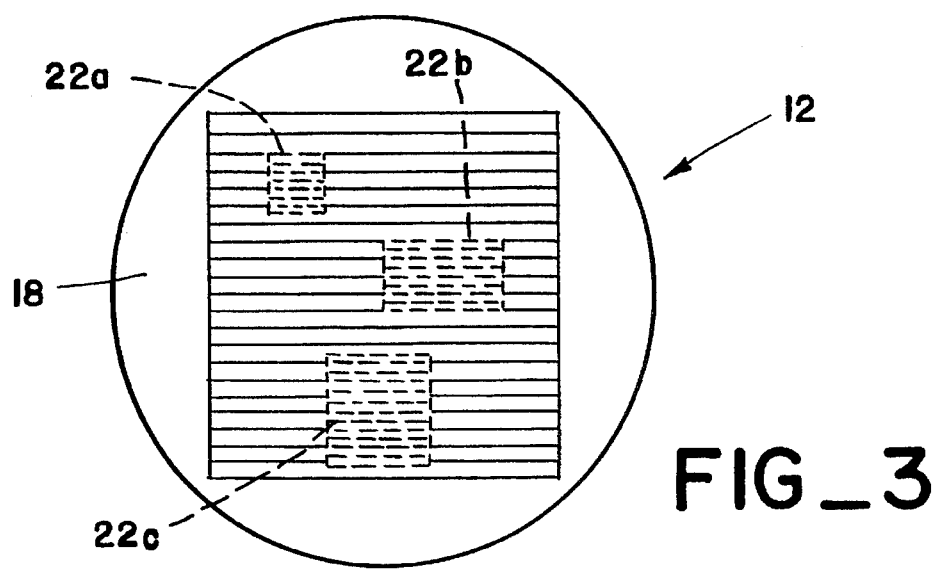
FIG_3
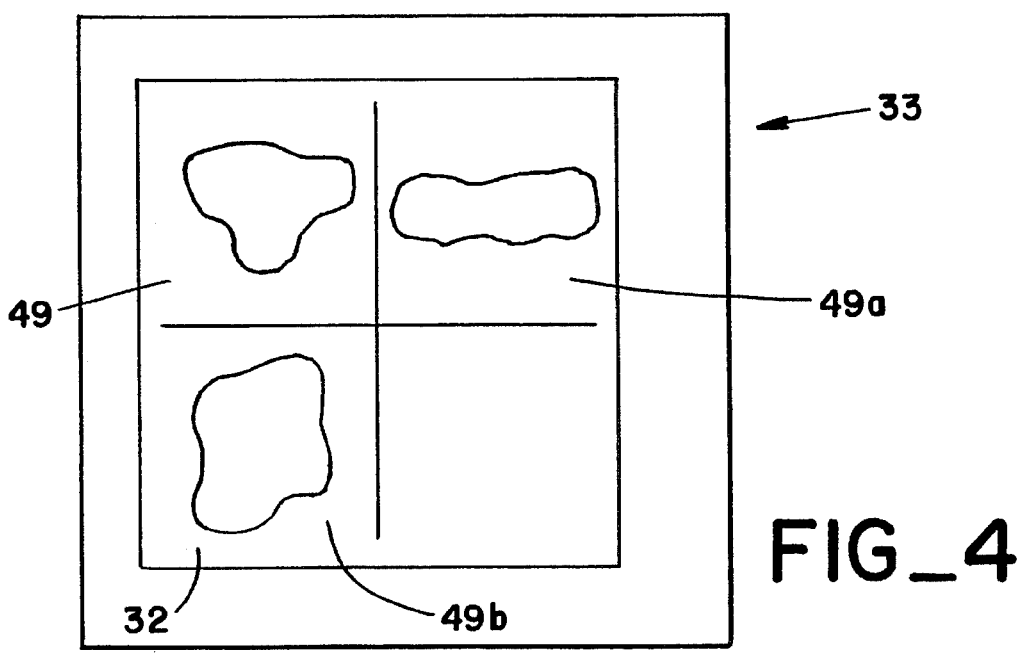
FIG_4
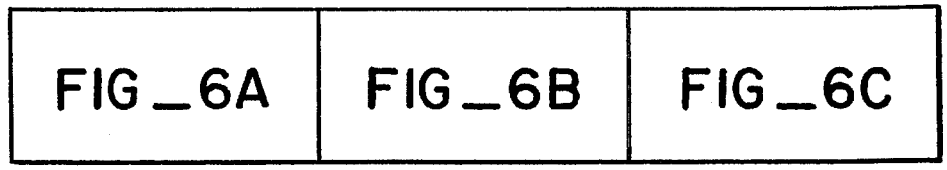
FIG_5

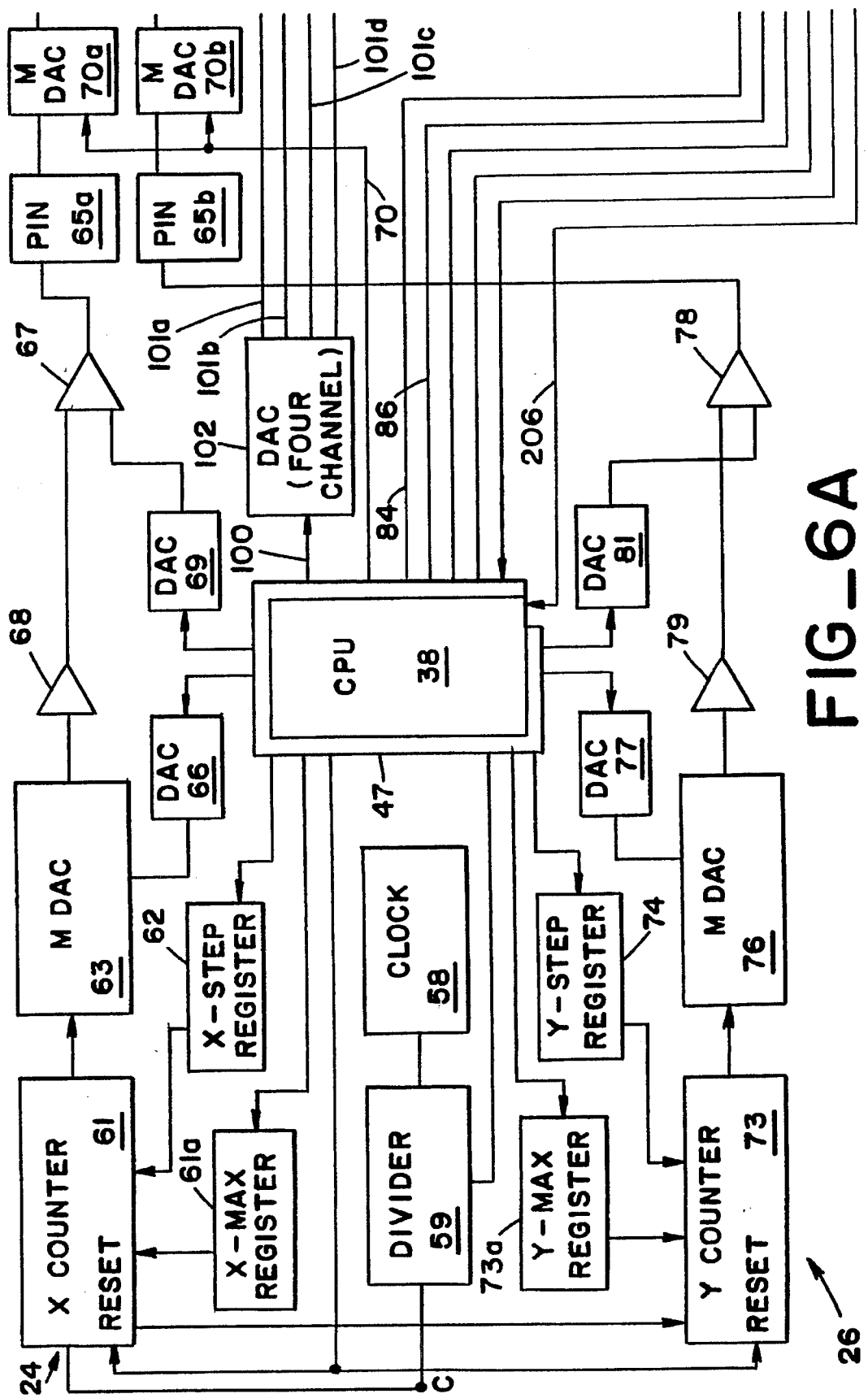
FIG_6A

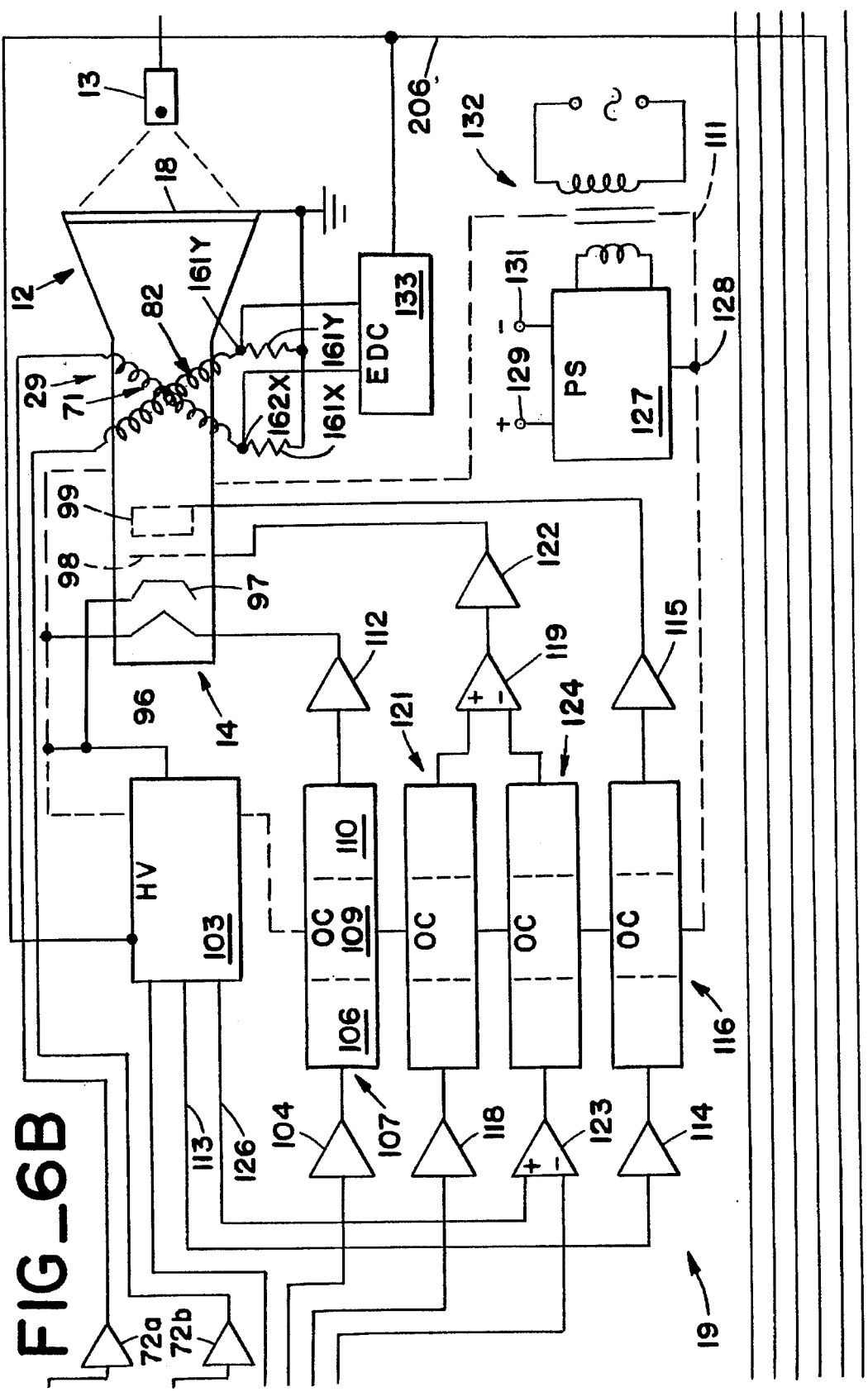
FIG_6B

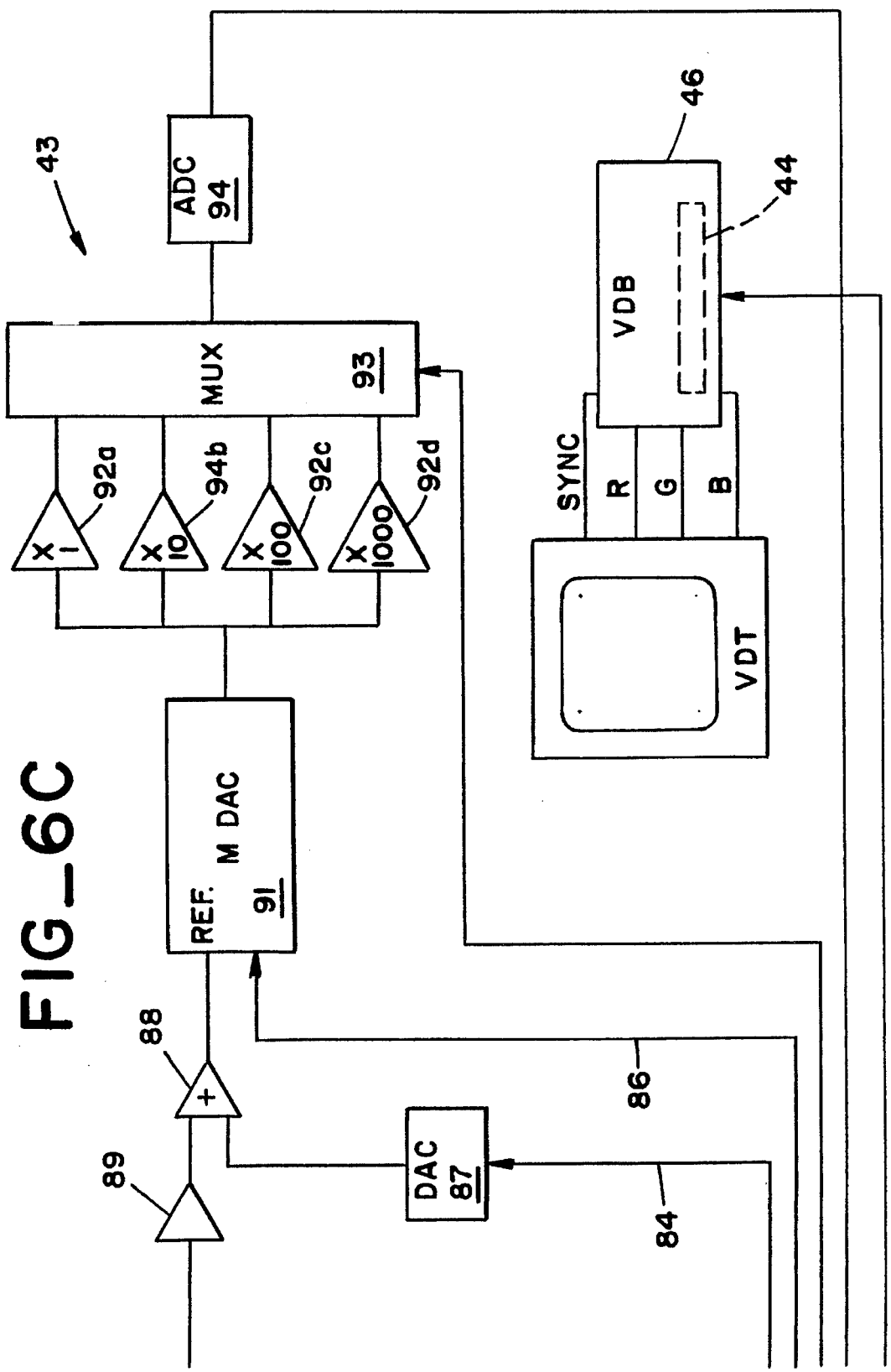

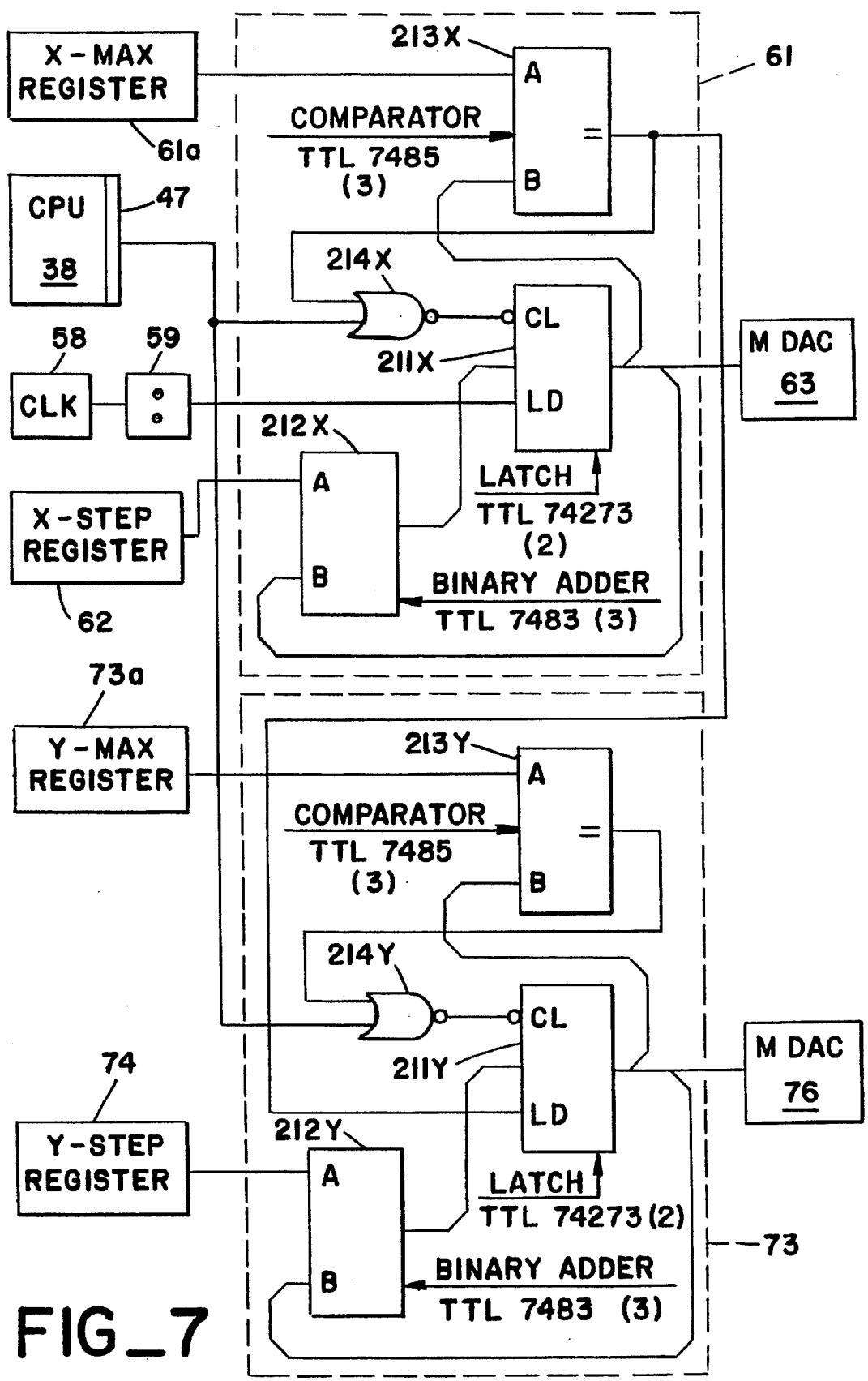
FIG_7

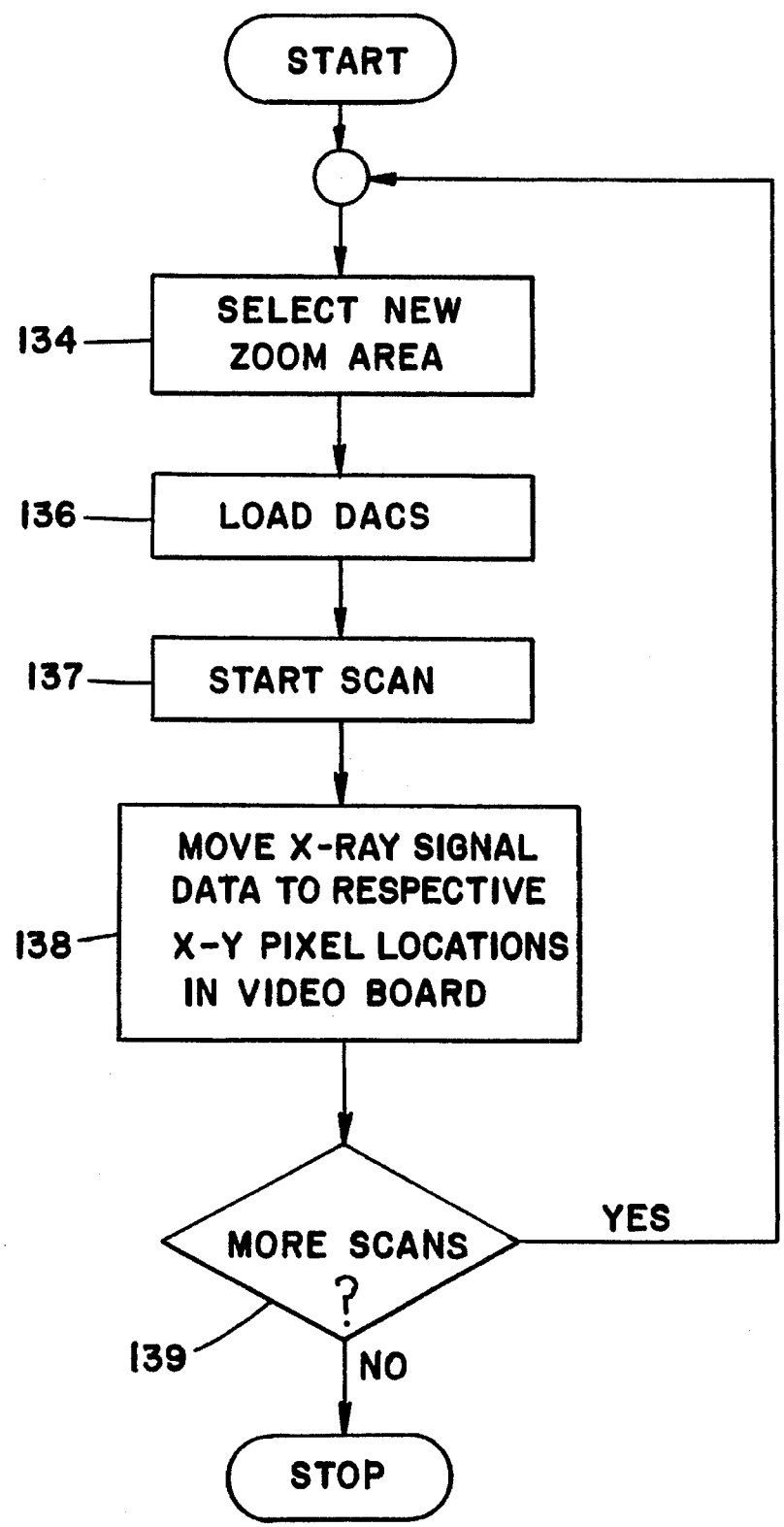
FIG_8

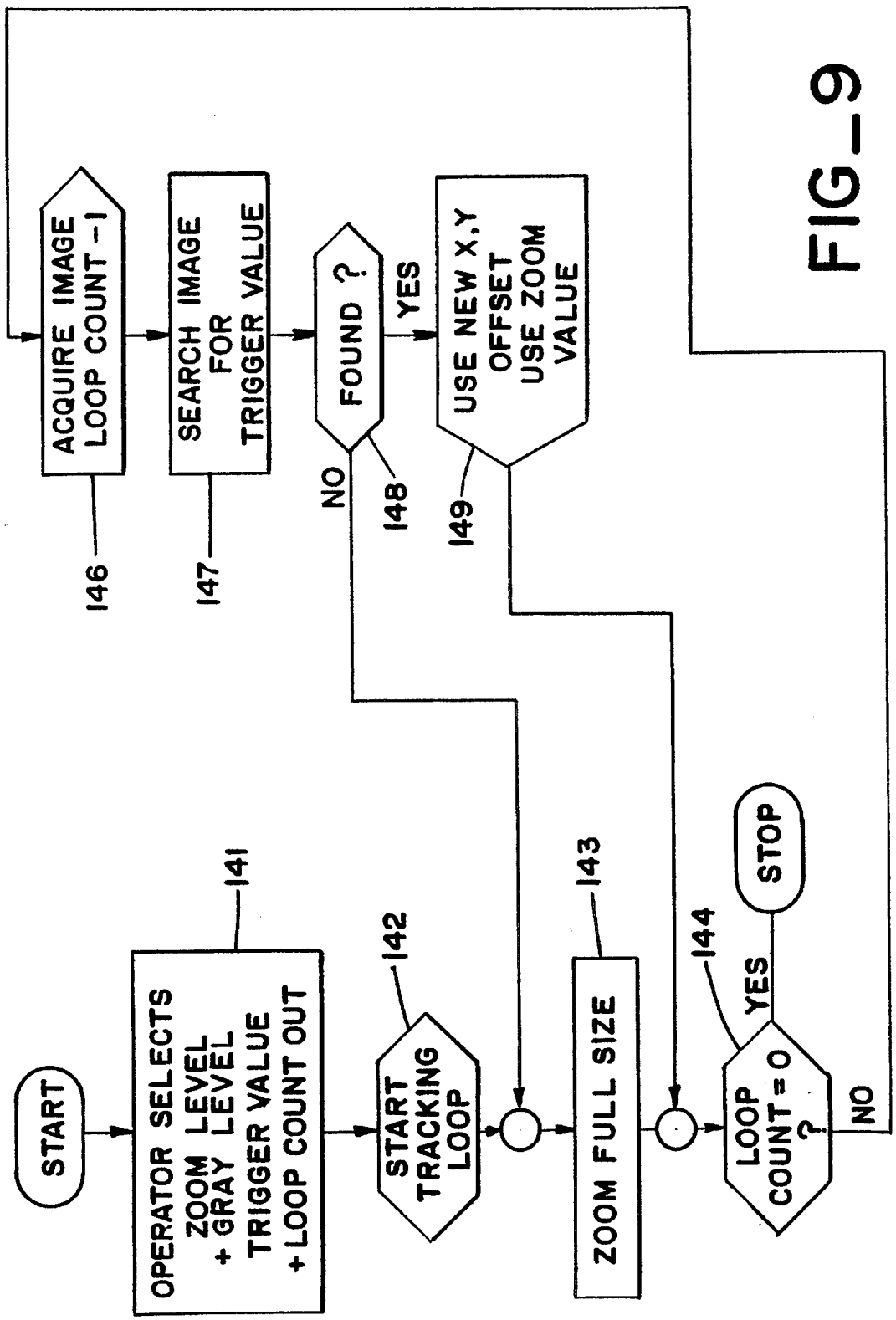
FIG_9

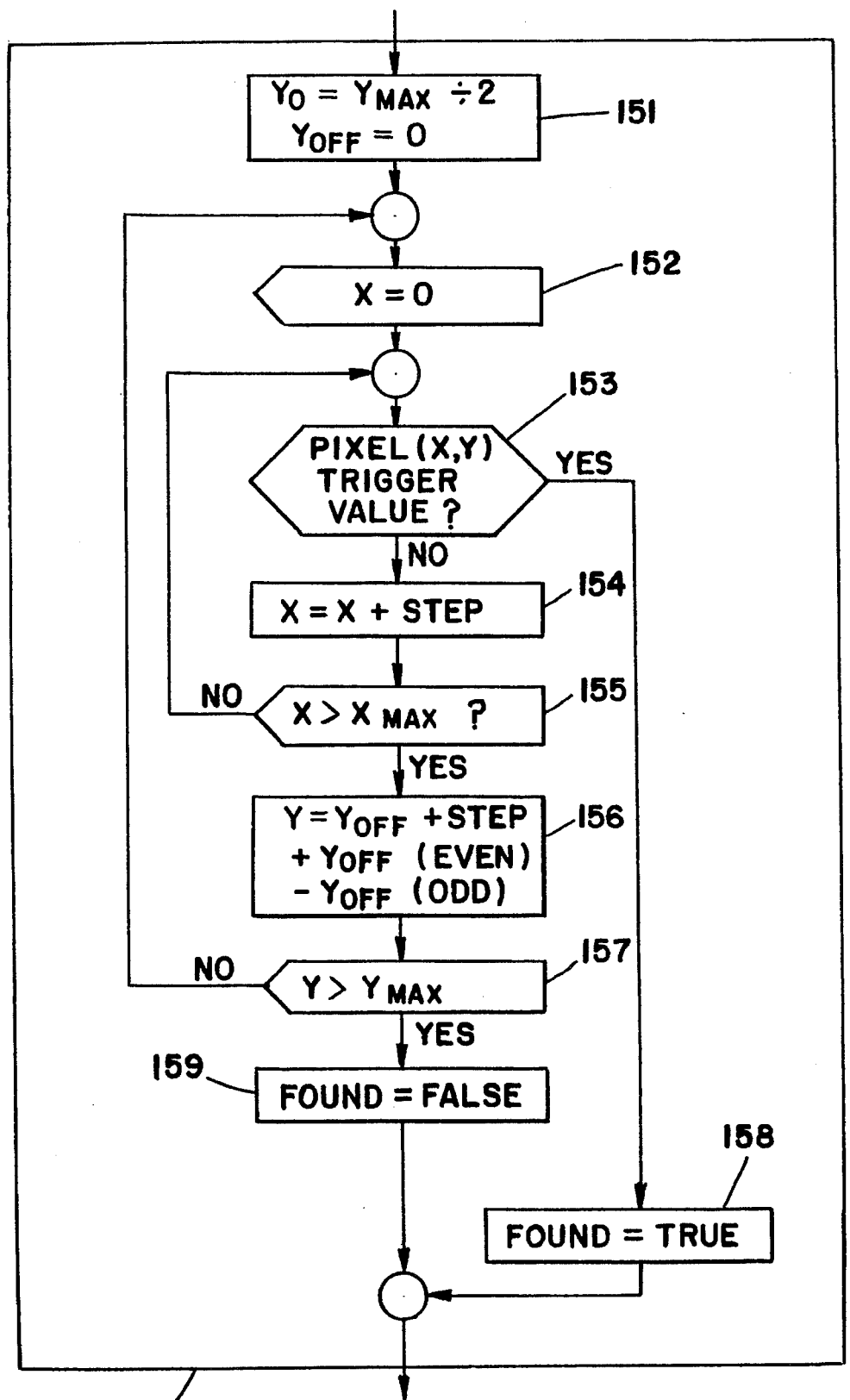
FIG_10

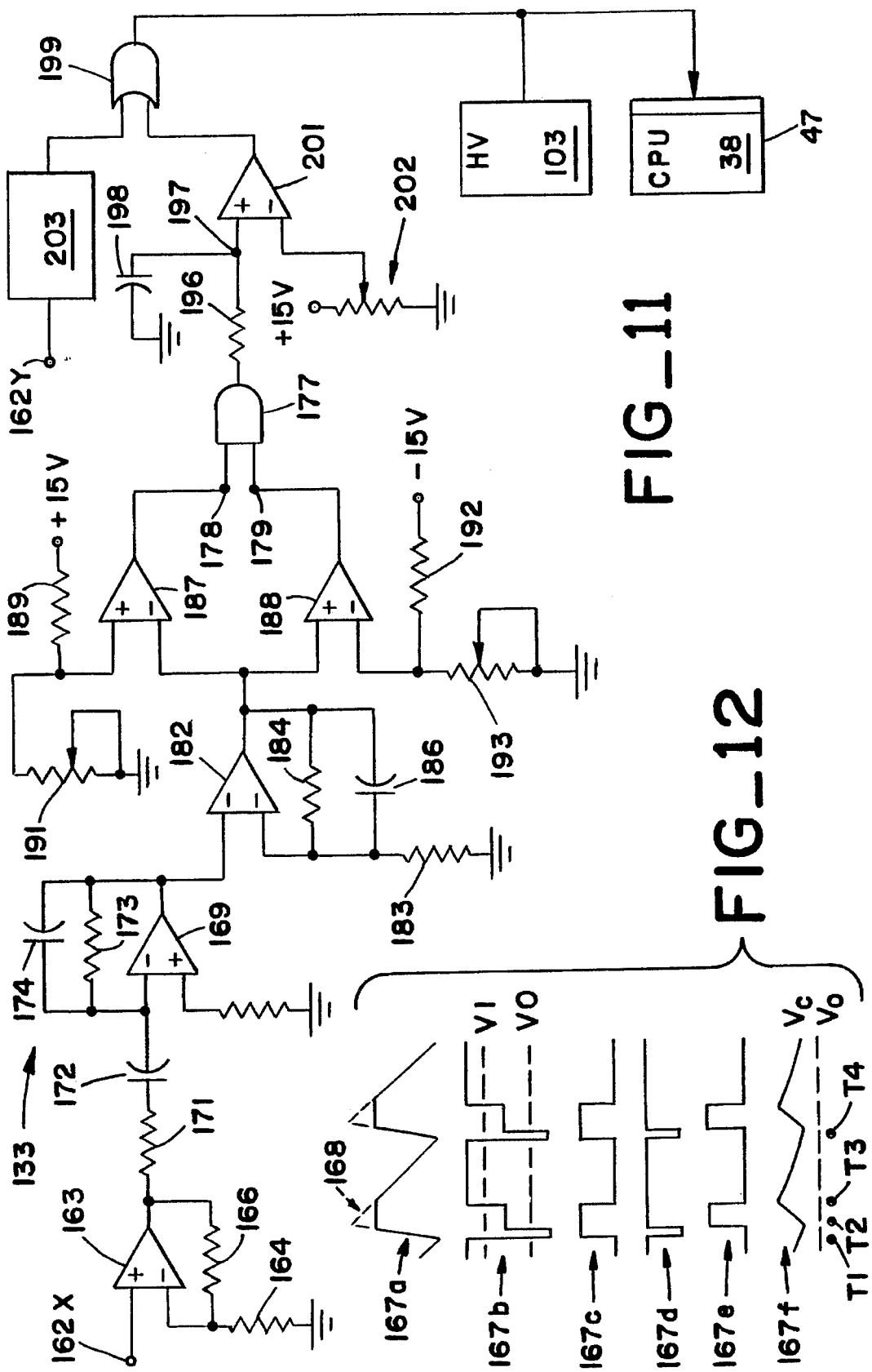

METHOD AND APPARATUS FOR DIGITAL CONTROL OF SCANNING X-RAY IMAGING SYSTEMS

CROSS REFERENCE TO RELATED APPLICATION

This is a continuation-in-part of copending application Ser. No: 07/959,605 filed Oct. 13, 1992 now U.S. Pat. No. 5,267,296 and entitled "Method and Apparatus for Digital Control of Scanning X-Ray Imaging Systems.

TECHNICAL FIELD

This invention relates to radiography. More particularly the invention relates to scanning x-ray imaging systems in which the subject is situated between an electronic x-ray detector and an x-ray source at which a moving x-ray origin point is swept in a raster pattern and in which the image may be displayed at the screen of a display monitor.

BACKGROUND OF THE INVENTION

Use of photographic film for obtaining x-ray images has several disadvantages. The image is not immediately available because of the need to develop the film. Radiation exposure of the subject is high and exposure time is prolonged as a majority of the x-rays do not react with the film. Fluoroscopic screens enable instant viewing of an image but are otherwise subject to many of the disadvantages of film.

Efforts to resolve the problems associated with older x-ray imaging techniques have included use of an image intensifier and video camera imaging chain to generate a visible image on the screen of a display monitor. This produces a third generation image which tends to be degraded by electronic noise. The first generation image appears on a fluorescent a screen at the input of the image intensifier and the second generation image appears at another fluorescent screen at the output of the intensifier. The third generation image is produced by a video camera that views the image intensifier output. In order to improve image quality, the electronic signal generated by the image intensifier has been digitized to enable computerized image enhancement but this produces only marginal improvement.

In some more recent systems, the image intensifier system is replaced with an array of minute electronic x-ray detectors such as charge coupled devices. Data for constructing the image is read out of the array on a pixel by pixel basis to provide an image which may be displayed at the screen of a video display monitor. Primary disadvantages of these systems include high cost and complexity and an undesirably small field of view.

All of the prior x-ray imaging systems discussed above use what may be termed conventional geometry. That is, the x-rays diverge from a small fixed point and are detected at a large area detector such as the film, screen or detector array. My prior U.S. Pat. No. 3,949,229 issued Apr. 6, 1976 and entitled "X-ray Scanning Method and Apparatus" discloses an advantageous imaging system having a reversed geometry. The system of that prior patent uses an x-ray source having an extensive anode plate which is raster scanned by an electron beam to provide a moving x-ray origin point. X-rays emitted from different successive locations on the large anode plate in the course of a raster scan converge at an electronic detector which has a relatively small x-ray sensitive area. A moving light origin point at the screen of a display monitor undergoes a similar raster scan and is modulated by the detector output signal to provide the x-ray image at an analog X-Y storage cathode ray tube component of the monitor.

The reversed geometry provides a number of advantages. Radiation exposure of the subject may be greatly reduced as the electronic detector responds to incoming x-rays much more efficiently than film or a fluoroscopic screen. Collimators of the type disclosed in my prior U.S. Pat. No. 4,465,540 issued Aug. 14, 1984 and entitled "Method of Manufacture of Laminate Radiation Collimator" may be used to suppress x-rays that are not directed towards the small detector and which are therefore incapable of contributing to the desired image. The system can also be relatively uncomplicated and inexpensive in comparison with other forms of x-ray scanning equipment.

The reverse geometry also enables magnification of an area of the image that is of particular interest without relative movement of the subject, x-ray source and detection means. This is accomplished by reducing the size of the raster pattern at the anode plate of the x-ray source without making a corresponding reduction in the size of the raster pattern at the image display monitor. Conventional geometry systems require repositioning of the subject and/or the source and detector in order to accomplish a similar result. Magnification without such repositioning in a conventional geometry system reduces resolution in the image.

Initiating such magnification in the reverse geometry system of prior U.S. Pat. No. 3,949,229 is a somewhat time consuming and involved operation as a series of different controls must be manually adjusted and operator coordination of the adjustments with each other is necessary. Varying other characteristics of the image and changing operating parameters of the scanning x-ray source also require operator coordination of various manual controls and can be time consuming and somewhat taxing. Analog controls of this kind do not enable a number of highly advantageous modes of operation that will hereinafter be described.

Reducing the size of the raster scan area at the x.-ray source to obtain a magnified image concentrates electron beam heating at a limited area of the anode plate. Avoiding heat damage to the x-ray source requires careful attention by the operator and still more control adjustments.

My prior U.S. Pat. No. 4,259,582, issued Mar. 31, 1981 and entitled "Plural Image Signal System for Scanning x-Ray Apparatus", discloses reverse geometry scanning x-ray apparatus of the above discussed kind which as an option enables digitizing of the detector output and sweep frequency signals and digital storage of data values from which the detector output voltage and the raster scan sweep frequency voltages can be reconstructed in order to reproduce the x-ray image at a later time. The system further enables certain forms of digital processing of the data to change characteristics of the image. This includes magnification of a selected area of the image but does not provide for increased resolution or definition in the magnified region of the image. Control of the x-ray source and scan raster parameters continues to require time consuming adjustments and coordination of various analog voltage controls on the part of the operator.

The present invention is directed to overcoming one or more of the problems discussed above.

SUMMARY OF THE INVENTION

In one aspect, the invention provides x-ray imaging apparatus having an x-ray source which includes an anode plate, means for directing an electron beam to the plate to produce x-rays at an x-ray origin point on the plate, and means for traveling the x-ray origin point in a raster scanning motion within a first raster scan area on the plate in response to an x-axis sweep frequency signal and a y-axis sweep frequency signal. An x-ray detector produces a detector signal that is indicative of variations of x-ray intensity at a detection point that is spaced apart from the anode plate. A monitor has an image display screen and means for moving a visible light origin point in a raster scanning motion within a second raster scan area at the screen. The intensity of the light origin point is modulated during the course of the raster scanning motion at the second raster scan area by the variations of the detector signal which occur during the course of the raster scanning at the first raster scan area. The apparatus further includes means for producing a first sequence of digital data bytes which encode successive values indicative of variations in the magnitude of the x-sweep frequency signal that are to occur during the course of the raster scanning at the first raster area, means for producing a second sequence of digital data bytes which encode successive values indicative of variations in the magnitude of the y-sweep frequency signal that are to occur during the course of the raster scanning at the first raster area, and means for producing the x-sweep frequency signal and the y-sweep frequency signal during the course of the raster scanning at the first raster scan area by conversion of the values encoded by successive data bytes of the first and second sequences into analog signals.

In another aspect, the invention provides X-ray imaging apparatus having an x-ray source which includes an anode plate and means for directing an electron beam to the plate to produce x-rays at an x-ray origin point on the plate and means for traveling the x-ray origin point in a raster scanning motion within a first raster scan area on the plate in response to x and y axis sweep frequency signals. An x-ray detector produces a detector signal indicative of variations of x-ray intensity at a detection point that is spaced apart from the anode plate. A monitor has an image display screen and means for moving a visible light origin point in a raster scanning motion within a second raster scan area at the screen. The intensity of the light origin point is modulated by the variations of the detector signal which occur during the course of the raster scanning motion at the first raster scan area. Means are provided for producing and storing digital signals which encode the location of a selected area of the image in response to area of interest selection controls. Further components include means for reducing the size of the first raster pattern at the anode plate in response to a zoom signal and means for positioning the reduced first raster pattern at a location on the anode that corresponds to the selected location on the image display screen that is encoded by the digital signals.

In another aspect, the invention provides a method for creating a radiographic image of a subject which includes the step of scanning an electron beam in a first raster pattern on an anode plate to produce a moving x-ray origin point. X-rays are detected at a detection point situated at the opposite side of the subject from the anode plate and a detector output voltage is produced in response to the detected x-rays. Further steps include sweeping a light origin point on a display screen in a second raster pattern and varying the intensity of the light origin point at successive points in the second raster pattern in accordance with variations of the detector output voltage at corresponding points in the first raster pattern, selecting an area of the image at the display screen for magnification, encoding the location of the selected area in digital signals and initiating a zoom signal. Still further steps in the method include reducing the size of the first raster pattern in response to the zoom signal and positioning the reduced first raster pattern at a location on the anode plate that corresponds to the location in the image that is encoded in the digital signals.

In still another aspect, the invention provides a method of obtaining a radiographic image of a subject which includes the steps of producing x-rays at an x-ray origin point on an anode plate of an x-ray tube by directing an electron beam to the plate, traveling the x-ray origin point in a raster scanning motion within a first raster scan area on the anode plate by applying an x-axis sweep frequency signal and a y-axis sweep frequency signal to the x-ray tube and detecting x-rays at a detection point situated at the opposite side of said subject from the x-ray origin point. Further steps include producing a detector signal that is indicative of variations of x-ray intensity at the detection point as the x-ray origin point moves to successive locations in the first raster scan area, producing a radiographic image by moving a visible light origin point at a display screen in a raster scanning motion within a second raster scan area at the screen and using the detector signal to produce variations of the intensity of the light origin point at successive locations in the second raster scan area. Still further steps in the method include producing a first sequence of digital data bytes which encode successive values indicative of variations in the magnitude of the x-sweep frequency signal that are to occur during the course of said raster scanning motion at the first raster scan area, producing a second sequence of digital data bytes which encode successive values indicative of variations in the magnitude of the y-sweep frequency signal that are .to occur during the course of the raster scanning motion at the first raster scan area and modulating the magnitudes of the x-sweep frequency signal and the y-sweep frequency signal during the course of the raster scanning at the first raster scan area by reference to the values encoded by successive data bytes of the first and second sequences thereof.

The invention enables faster operation of reversed geometry scanning x-ray systems, simplifies the operator's control manipulations and expands the capabilities of the system with respect to producing images of different types by enabling digital data processor control of the scanning x-ray source and image characteristics. The operator may, for example, zoom in to magnify one or more areas of the image that are of particular interest by simple actuations of one or more standard computer input devices. In the preferred form of the invention, high resolution scanning of the subject can be limited to selected regions which are of interest thereby reducing scanning time and minimizing radiation exposure of the subject. Magnified high definition images of selected regions of a subject can be acquired, stored, digitally enhanced in any of various ways and then be displayed sequentially or simultaneously. In the preferred form, the system can produce an unblurred image of a moving subject by automatically shifting the location of the raster scan at the anode plate of the x-ray source as necessary to track the movement of the subject. The preferred form of the invention also automatically adjusts the voltages and currents that are applied to components of the scanning x-ray source during different modes of operation to avoid overheating of the anode component. In the preferred form, the invention enables variation of the aspect ratio or height to width ratio of the image in response to digital signals to facilitate imaging of differently shaped subjects or, in the case of a moving subject, to compensate for an image distortion which can otherwise result from the motion of the subject.

The invention, together with further aspects and advantages thereof, may be further understood by reference to the following description of the preferred embodiment and by reference to the accompanying drawings.

BRIEF DESCRIPTION OF THE DRAWINGS

FIG. 1 is in part a perspective view of a scanning x-ray source and x-ray detector and in part a block diagram showing major components of the preferred embodiment of the invention.

FIG. 2 depicts the screen of a video display monitor and certain other components of the apparatus of FIG. 1 and diagramatically depicts operations which are involved in the process of acquiring magnified high resolution images of regions of a lower resolution image that are of particular interest.

FIG. 3 depicts the face of the x-ray source of FIG. 2 at later stages in the process of acquiring high resolution images of selected areas of interest.

FIG. 4 depicts the display screen of FIG. 2 during simultaneous presentation of a plurality of the high resolution images of areas of interest.

FIG. 5 is a diagram showing how FIGS. 6A, 6B and 6C may be disposed in side by side relationship to form a single continuous circuit diagram.

FIGS. 6A, 6B and 6C are jointly a circuit diagram showing the apparatus of the preceding figures in greater detail.

FIG. 7 is a circuit diagram depicting counter components of the circuit of FIG. 6A in still greater detail.

FIG. 8 is a program flowchart of computer operations which take place during the process of obtaining and storing data for enabling display of magnified, high resolution images of areas of particular interest that have been selected in a wider angle, lower resolution image.

FIG. 9 is a program flowchart of computer operations involved in acquiring digitized image data of areas in an image at which a grey scale transition of selected magnitude occurs and which may be used to produce an unblurred image of a moving object without physical movement of the x-ray source and/or the detector.

FIG. 10 is a program flowchart of computer operations involved in automatically searching an image to locate grey scale transitions of the type that are tracked by the operations shown in FIG. 9.

FIG. 11 is a circuit diagram of a sweep frequency error detection circuit which is depicted in block form in FIG. 6B.

FIG. 12 depicts voltage variations as a function of time that occur at certain points in the circuit of FIG. 11.

DETAILED DESCRIPTION OF THE PREFERRED EMBODIMENT

Referring initially to FIG. 1 of the drawings, an x-ray imaging system 11 in accordance with this embodiment of the invention includes a scanning x-ray source or tube 12 and an x-ray detector 13 which components may be similar to those described in my hereinbefore discussed U.S. Pat. No. 3,949,229.

The scanning x-ray source 12 has an electron gun 14, situated in an evacuated envelope 16, which directs an electron beam 17 towards an electrically conductive anode plate 18 that forms the front face of the envelope. Anode plate 18 is grounded and a tube voltage supply circuit 19 applies a high negative voltage to the electron gun 14. The voltage difference accelerates electron beam 17 and the impact of the high energy electrons on anode plate 18 results in emission of x-rays at an x-ray origin point 21 situated at the point of impact of the beam on the plate.

The x-ray origin point 21 is swept in a first raster pattern 22 on anode plate 18 by beam deflection means 23 which receives beam deflection signals from an x-axis sweep frequency generator 24 and a y-axis sweep frequency generator 26. X-axis sweep frequency generator 24 produces a voltage having a sawtooth waveform that exhibits repetitive rises separated by abrupt drops while y-axis generator 26 produces a similar waveform that rises and drops at a lower frequency. Consequently, x-ray origin point 21 scans anode plate 18 along a series of substantially parallel scan lines 27 that jointly define the first raster pattern 22. As will hereinafter be described in more detail, sweep frequency generators 24 and 26 adjust the output voltages as needed to compensate for pincushion distortion and to accommodate to changes of electron beam energy.

The beam deflection means 23 in this embodiment includes a magnetic deflection yoke 28 of the known form although it is also possible to make use of known forms of electrostatic beam deflector.

X-ray detector 13 is spaced apart from the x-ray source 12 and the subject 29 which is to be imaged is situated between the source and detector. The detector 13 may be of one of the known types which has a small, radiation sensitive area 31 and which produces an output signal voltage that varies in accordance with variations of x-ray intensity at the sensitive area. The detector 13 may, for example, be a scintillation detector or small ionization detector although other forms of detector may also be used.

The x-ray image is displayed at the screen 32 of a video display monitor 33 which may be of the known type in which a light origin point 34 at the screen is scanned in a raster pattern 36 in response to x and y axis sweep frequency voltages of the hereinbefore described kind and in which the intensity of the light origin point is modulated in the course of the raster scan in response to a z-axis or intensity signal. The x-ray image may be produced by establishing a raster pattern 36 at monitor 33 that is similar to the raster pattern 22 that occurs at the x-ray source 12 and by modulating the intensity of light origin point 34 in the course of the raster scan in accordance with variations of the detector 13 output voltage that occur in the course of a raster 22 scan at the x-ray source. This produces a radiographic image as the detector output voltage at any given instant is determined by the x-ray absorbency of the region of the subject 29 that lies on a line extending from the momentary position of the x-ray origin point 21 to the relatively small x-ray sensitive area 31 of the detector 13. Thus variations of x-ray absorbency at successive stages of the scan cause corresponding variations in the brightness of the image at display screen 32.

In the original x-ray imaging systems of this general kind, the x and y sweep frequency generators were analog circuits and sweep frequency voltages corresponding to the output of the generators were simultaneously applied to the x-ray source and display monitor to synchronize the raster scans. Voltage variations at the output of the x-ray detector were also processed in analog form and were applied to the z or intensity signal terminal of the display monitor. The present invention greatly facilitates control of the system 11 and enables novel modes of operation by employing digital data processing techniques to control the beam deflection means 23, the electron gun 14 and characteristics of the image at display monitor 33 and by digitizing the detector 13 output signals. A computer central processing unit 38 and standard operator input devices may then be used to initiate different modes of operation of the system 11 and also to automatically adjust operating voltages and currents as needed to accommodate to the different modes of operation. The input devices of this particular embodiment are a keyboard 41 and track ball 42 although other known forms of operator input device may be substituted or used in conjunction with such inputs.

For example, the operator may select one or more particular areas of an initial full sized image at the display monitor screen 32 for rescanning at higher resolution and for presentation as a magnified image. The magnified images, which may have selectable sizes and ratios of height to width, may then be displayed in sequence or simultaneously. Simple input manipulations at keyboard 41 enable the operator to change the size, shape and location of the raster scan pattern 22 at the tube anode plate 18 in order to inspect different regions of the subject 29 or these parameters may be automatically varied by programming of the central processing unit 38. Resolution and scan speed at the x-ray source 12 may also be varied by the operator or in response to programming. The program of this embodiment of the invention also enables operator initiation of standard forms of image processing including colorizing of the image based on different gray scale levels in the image, edge enhancement, field flattening, stretching or compression of the image, image subtraction and histogram equalization.

A detector circuit 43 generates a sequence of serial data bytes which encode values indicative of changes of x-ray intensity at detection point 31 during the course of each raster scan at the tube 12. In one mode of operation the data bytes are transmitted to the buffer storage 44 of a video board 46 through a computer interface 47 and are stored at x-y addresses in the buffer storage that correspond to successive points in the raster scan at tube 12. Alternately, in instances where high precision image processing or high resolution scanning are to be performed, interface 47 first transmits the detector signal data bytes to the memory 48 of the central processing unit 38 and the processed data is then transmitted to buffer storage 44. The video board 46, which may be of known form, sequentially converts the stored x and y addresses and digital detector signal values to analog voltages which are transmitted to monitor 33 to cause the raster scan 36 and radiographic image display.

A magnified, high resolution image of an area 49 of the subject 29 that is of particular interest is produced by reducing the size of the raster pattern 22 at tube 12 as depicted by dashed line 22a and by shifting the location of the reduced raster pattern on anode plate 18, if necessary, to cause x-rays which travel from the reduced raster pattern to detection point 31 to pass through the area of interest 49. As the raster pattern 36 at monitor 33 remains full sized, an enlarged image of the area 49 is produced at screen 32. A relatively dense inclusion 51 in the subject 29 that appears at an off center location at screen 32 during a full sized raster scan at tube 12 appears at a more centered location 51a on the screen in the subsequent magnified image if the reduced raster pattern 22a has been shifted to be centered on the inclusion.

Referring to FIG. 2, central processing unit 38 has a cursor control circuit 52 of the known form which controls the movement of a small visible cursor symbol 53 at display screen 32 in response to the operator's manipulations of the track ball 42 or cursor controls at keyboard 41. Upon inspection of a full size image at screen 32, the operator may select a localized area 49 of interest for magnification by initially traveling cursor 53 to the upper left corner of the area 49. An initial actuation of the track ball switch 54 signals the central processor to store the x and y axis raster address of that corner in memory 48. The operator than moves cursor 53 to the lower right corner of area 49 and a second actuation of track ball switch 54 results in digital storage of the raster address of that corner.

CPU 38 interprets the second actuation of track ball switch 54 as a zoom signal and initiates a rescanning at x-ray source 12 within a reduced raster pattern 22a. Utilizing the stored area of interest raster addresses, CPU 38 determines and initiates changes in the x and y sweep frequency waveforms that are needed to confine the reduced raster pattern 22a to the portion of the original full sized raster pattern that begins at an address corresponding to the first stored raster address and ends at the address which corresponds to the second stored raster address.

Referring jointly to FIGS. 2 and 3, the reduction and relocation of the x-ray tube raster pattern enables production of a magnified, high resolution image at screen 32 in the manner previously described.

To expedite x-ray inspection of subjects that may have a number of areas 49 of particular interest, central processing unit 38 is programmed to store a plurality of sets of tube raster scan addresses which are selected by the operator in the above described manner, three such areas 49, 49a and 49b being depicted in FIG. 2. Actuation of a keyboard key 56 instructs central processing unit 38 to execute the corresponding three reduced and repositioned raster scans 22a, 22b and 22c in sequence and to store the resulting image data as three separate images that can be read out to produce video signals for transmission to the display monitor 33 in the manner previously described. The data is stored in the buffer storage 44 of video board 46 unless high precision image processing or very high resolution scanning is performed in which cases the data is temporarily stored in CPU memory 48.

By actuating different ones of the keyboard keys 56, the operator may optionally initiate a full sized display of a selected one of the areas of interest 49, 49a and 49b or a simultaneous display as shown in FIG. 4 in which each image appears at a separate quadrant of the display screen 32. Images having a resolution that is greater than the resolution of the display screen 32 are stored in CPU memory 48. Actuation of different keyboard keys 56 causes selected portions of the full image data to be moved to the video board buffer storage 44 for readout and display.

During the process of selecting the areas 49 of interest, it is preferable to sequence the selection of the individual areas in a manner which avoids scanning of a particular area of the tube anode plate 18 immediately after scanning of an adjacent area. Scanning of adjacent areas should be separated in time. This allows each scanned area of the anode plate 18 to cool before scanning of an adjacent area and thereby avoids anode damage from overheating.

The capability of limiting high resolution scanning of the subject to only selected areas of interest enables faster scanning operations and reduces radiation exposure of the subject. This is advantageous in medical, dental and industrial x-ray procedures. As one specific example, throughput in the online inspection of printed circuit board solder joints can be increased as only the portions of the boards that contain such joints require inspection.

The vertical spacing of the scan lines 27 in FIG. 2 and in the other figures and the horizontal spacing of x addresses or image pixels 57 have been exaggerated in the drawings for clarity of illustration. Such spacings determine resolution or definition in the images and, as will hereinafter be described in more detail, are adjustable and selectable by the operator or by computer programming.

FIGS. 6A, 6B and 6C, which may be disposed in end to end relationship as shown in FIG. 5 to form a single circuit diagram, show the circuits of the above described embodiment of the invention in greater detail.

Referring initially to FIG. 6A in particular, a system master clock 58 generates repetitive clock pulses which cycle and synchronize digital components of the apparatus. The clock pulses are transmitted to a divider 59 which outputs clock pulses at a selectable frequency determined by a divisor value received from central processing unit 38. The divider 59 enables selection of a raster line scan speed by the operator at the keyboard or by computer programming. In this example of the invention scan speed can be varied to complete a raster scan during a time interval which may range from $\frac{1}{16}$ second to 8 seconds.

The x-axis sweep frequency generator 24 has a first pulse counter 61 which counts the clock pulses from divider 59 and which resets to a count of zero and begins a recount each time that a maximum count is reached. For reasons which will hereinafter become evident, a count of zero at counter 61 positions the electron beam at the left side of the raster scan area, progressively higher counts travel the beam along a horizontal scan line and the beam is at the right side of the scan area when the maximum count is reached. The counter 61 resets to a count of zero and begins a recount each time that it reaches a count equal to the maximum count. To enable a particular mode of operation which will hereinafter be described, the maximum count is preferably variable in response to operator input at the keyboard or to programming of the central processing unit. For this purpose, counter 61 may be provided with an x-max register 61a which receives the maximum count value from the central processing unit. Counter 61 increments in accordance with a step value stored in a step register 62 which value determines image resolution in the horizontal direction. The step value is received from central processing unit 38 in response to operator input or the program and is variable to enable variation of image resolution. In the present embodiment, horizontal resolution can be varied from 256 pixels to 2048 pixels.

Counter 61 produces a sequence of digital data bytes which encode successive changes in the accumulated count and which are transmitted to a digital to analog signal converter 63 which outputs a voltage that changes in accordance with the changing values encoded by successive data bytes from the counter. Thus the output of converter 63 has a sawtooth waveform which exhibits repetitive rises separated by relatively abrupt drops.

Digital to analog converter 63 is of the known multiplying type which exhibits a variable gain that depends on the magnitude of a reference voltage that is applied to one input of the converter. The degree of change in the output voltage of the converter that results from a given change in the numerical value encoded in the digital input signal is a function of the magnitude of the reference voltage. The reference voltage is received from another digital to analog converter 66 in response to a digital value transmitted from the central processing unit 38 in response to operator input from the keyboard or in accordance with programming of the unit 38. The amplitude of the output voltage from converter 63 determines the length of the raster scan lines at the x-ray source. Thus the size of the raster scan pattern at the x-ray source, in the x or horizontal direction, is reduced by reducing the reference voltage that is applied to converter 63.

To enable shifting of the position of a reduced raster scan pattern at the x-ray source in the x axis or horizontal direction, the output of the converter 63 is coupled to one input of an adding amplifier 67 through a buffer amplifier 68. In response to operator input from the keyboard or to programming, central processing unit 38 generates a pan signal in digital form which is converted to a voltage by another digital to analog converter 69 which voltage is applied to the other input of amplifier 67. Amplifier 67 functions as a summing junction and produces an output voltage which includes the varying voltage received from buffer amplifier 68 and a continuing time independent component determined by the magnitude of the voltage that is received from converter 69.

The output of amplifier 67 is applied to a pincushion correction circuit 65a which also receives the corresponding voltage from the y axis sweep frequency generator 26. Circuit 65a is a function generator which delinearizes the x-axis sweep frequency signal to correct for pincushion distortion. The correction circuit 65 may be of the known design that is widely used in television equipment and other systems having image producing cathode ray tubes.

The high voltage which is applied to the x-ray source is adjustable and is determined by a digital control signal which originates at central processing unit 38 as will hereinafter be described in more detail. In the absence of compensation, changing the high voltage at the cathode of the x-ray source will result in a change in the size of the raster pattern as the degree of electron beam deflection that takes place is in part a function of beam energy. To enable variation of the high voltage without such effects, the corrected x-sweep frequency signal from correction circuit 65a is applied to a multiplying digital to analog converter 70a which multiplies the signal voltage by a value which is computed by and received from the central processing unit 38 through a data bus 70, the value being equal to the square root of the value represented by the current high voltage control signal.

The output of converter 70a is applied to the x-axis deflection coil 71 of the electron beam deflection yoke 28 through a power amplifier 72a.

Referring jointly to FIGS. 6A and 6B, the variable component of the x sweep frequency signal causes the electron beam to repeatedly scan along the scan lines of the raster pattern while the continuing time independent component causes a displacement of the raster pattern from a centered position at the x-ray tube anode plate 18, in the x axis direction, that is determined by the magnitude of the time independent component. Thus the raster pattern can be shifted in that direction to a selected extent by varying the pan signal which is transmitted to converter 69 by the central processing unit 38.

The y axis sweep frequency generator 26 includes a second pulse counter 73 which receives an input pulse from the first pulse counter 61 each time that the first counter resets to a count of zero which resetting occurs at the completion of scanning of each line in the raster pattern. Each such input pulse increments the accumulated count by an amount determined by a step value which is transmitted to a step register 74 from the central processing unit 38 in response to operator input at the keyboard or in response to programmed instructions. The step value determines image resolution in the vertical or y direction. A count of zero positions the electron beam at the top of the raster scan area and progressively higher counts step the beam to progressively lower levels in the scan area. Second counter 73 resets to a count of zero each time that the accumulated count reaches a maximum value that is set into a y-max register 73a by the central processing unit 38 in response to operator input or programmed instructions.

The second counter 73 outputs a second sequence of digital data bytes encoding successive changes in the accumulated count. A second multiplying digital to analog converter 76 converts the values represented by successive data bytes into a stepped output voltage which progressively changes between minimum and maximum values during the course of each full raster scan or frame. The gain or degree of change of the output voltage that occurs in response to a given change in the numerical input to converter 76 is again determined by a variable reference voltage that is applied to the converter. The reference voltage is produced by another digital to analog converter 77 and has a magnitude determined by a numerical value that is transmitted to converter 77 by central processing unit 38 in response to keyboard input or the programmed instructions.

Shifting of the position of a reduced raster scan pattern on tube anode plate 18 in the y-axis or vertical direction is provided for by coupling the output of multiplying digital to analog converter 76 to one input of another adding amplifier 78 through another buffer amplifier 79. In response to keyboard input or programming, central processing unit 38 transmits a scroll signal in digital form to another digital to analog converter 81 which applies a voltage to the other input of adding amplifier 78 that has a magnitude determined by the numerical value received from the central processing unit. Thus the output voltage of amplifier 78 varies in accordance with the output voltage of multiplying converter 76 but may have a continuing, time independent component determined by the numerical value that is being set into converter 81.

The amplifier 78 output voltage is applied to the y-axis deflection coil 82 of beam deflection yoke 28 through another pincushion correction circuit 65b, multiplying digital to analog converter 70b and power amplifier 72b which components may be similar to the hereinbefore described corresponding components of the x-axis sweep frequency generator circuit 24.

The stepped progressively changing component of the y-axis sweep frequency signal causes the electron beam to scan along successive different ones of the scan lines in the raster pattern. The time independent component shifts the raster pattern away from a centered location on anode plate 18, in the vertical or y direction, by an amount determined by the magnitude of that component.

Thus the size of the raster scan pattern at the x-ray tube 11 may be varied to a selected degree in the horizontal direction and the vertical direction by varying the digital values which are applied to digital to analog converters 66 and 77. The aspect ratio or width to height ratio of the raster scan pattern can also be varied by changing the ratio of the digital values that are applied to converters 66 and 77. A reduced raster scan pattern may be displaced from a centered location on anode plate 18 in the horizontal direction or the vertical direction or both by varying the digital values applied to converters 69 and 81. Scan speed is selectable by varying the digitally encoded divisor value that is applied to divider 59. Resolution in the image in the horizontal direction and the vertical direction is selectable by varying the digital values applied to step controls 62 and 74. This enables the previously described production of magnified, high resolution images of selected areas of interest in the subject by simple keyboard manipulations or in response to programming of the central processing unit 38.

FIG. 7 depicts internal components of the first and second pulse counters 61 and 73 in this example of the invention. Within the first or x-counter 61, a digital data latch 211x receives the output of a binary adder 212x and has a load terminal which receives the clock pulses from divider 59. Thus the initial clock pulse at the start of a raster scan causes the latch 211x to store a numerical value corresponding to the value which is currently being outputted by adder 212x which value is zero at that time. Adder 212x has one input which receives the output of latch 211x and a second input which receives the value which is currently stored in the x step register 62 as previously described. Consequently, the second clock pulse causes latch 211x to replace the previously stored value with a new value that is equal the previously stored value plus an increment determined by the step register value. Thus the latch 211x successively stores progressively higher values in response to successive clock pulses which values differ by the value stored in the step register 62. The successive values that are stored by latch 211x are applied to the digital input of the previously described multiplying digital to analog converter 63.

The value which has been stored in the x-max register 61a as previously described is applied to the reference input of a digital comparator 213x. The other input receives the value which is currently stored in the latch 211x. Thus the output of comparator 213x becomes high when the value currently being stored by the latch 211x becomes equal to the value stored in the x-max register 61a. The output of comparator 213x is coupled to the clear or reset terminal of latch 211x through one input of a NOR gate 214x which inverts the output. The latch 211x in this embodiment is of the known type which resets to a count of zero when the voltage at the clear terminal goes low. Thus scanning along each horizontal line ends after a particular number of clock pulses have been received which number is determined by the value which has been set into the x-max register 61a.

The other input of NOR gate 214x is connected to the central processing unit 38 through interface 47 to enable resetting of the x-counter 61 in response to operator input at the keyboard or in response to instructions in the program.

Internal components of the second or y-counter 73 include another latch 211y, binary adder 212y, comparator 213y and NOR gate 214y. These components may be similar to those of the first counter 61 and are interconnected and operate in a similar manner except that the load terminal of latch 211y receives the output of comparator 213x of the first counter instead of receiving clock pulses, the reference input of comparator 213y receives the digital value which has been set into the y-max register 61a, the digital value stored in y-step register 74 is applied to one input of binary adder 212y instead of the x-step value and the successive values which are stored by latch 211y are applied to the previously described multiplying digital to analog converter 76 rather then to converter 63.

Thus the digital value which is outputted by counter 73 increments upwardly, by an amount determined by the value in y-step register 74, at each time that scanning of a horizontal line is completed and the counter is reset to zero after scanning of a number of horizontal lines that corresponds to the value which has been set into y-max register 73a.

In this example of the invention, the components of counters 61 and 73 are industry standard TTL integrated circuits. Latches 211x and 211y are TTL74273 8-bit latch ICs of which two are needed in each counter to accommodate to the 12 bit input values which are established by the computer program which will hereafter be described. Adders 212x and 212y in this example are each formed of three TTL7483 four bit adder ICs. Comparators 213x and 213y each include three TTL-7485 four bit comparator integrated circuits. NOR gates 214x and 214y are TTL7402 devices.

With an exception which will hereinafter be pointed out, all digital to analog converters in this example of the invention are AD DAC80 integrated circuits manufactured by Analog Devices, Norword, Mass., U.S.A. All multiplying digital to analog converters are AD7541 ICs from the same manufacturer. Clock 58 is an MXO55GB2C-4.0 manufactured by CTS Corporation, Sandwich, Ill., U.S.A and divider 59 is a TTL7497. All registers in this embodiment are TTL74273 integrated circuits.

Use of a computer 38 to produce the above described digital signals which control the operating parameters of the x-ray source 12 is highly advantageous as it also enables digital image processing and programmed control of the system to effect a variety of different modes of operation. Simpler and less versatile systems may not necessarily require a computer. The digital signals for setting and varying the operating parameters of the x-ray source 12 can, in some instances, be generated directly at a digital keypad or other device of the type which produces selectable digital signals in response to operator input. In automated systems where the x-ray source 12 is intended to cycle repetitively in a predetermined manner, the digital control signals for cycling the x-ray source may be repetitively read out of a digital data storage such as magnetic tape or a disk for example.

Referring to FIGS. 6A, 6B and 6C, brightness and contrast in the displayed images may also be varied by operator actuations at the keyboard or by the programming of the central processing unit 38. For this purpose, unit 38 transmits a brightness signal to the detector circuit through a bus 84 which signal encodes a digital value indicative of the desired brightness and transmits a desired contrast signal in digital form through another bus 86. With reference to FIG. 6C in particular, components of the detector circuit 43 include a digital to analog converter 87 which receives the brightness signal from bus 84 and which applies a voltage having a magnitude determined by the signal to one input of an adding amplifier 88. The other input of amplifier 88 receives the output signal from the x-ray detector 13 through a preamplifier 89. Amplifier 88 adds the brightness signal voltage to the preamplified detector output voltage. Thus the average value of the detector signal at the output of amplifier 88 can be adjusted by varying the brightness signal.

The detector signal at the output of preamplifier 89 is negative in this particular example of the invention and has a range of 0 to −10 volts. Detector circuits providing other ranges and positive signals can also be used if the ranges of preamplifier 89 and digital to analog converter 87 are matched to the circuit.

The contrast control signal from bus 86 is received by a multiplying digital to analog converter 91 and the detector signal voltage from amplifier 88 is applied to converter 91 as the reference voltage that determines the multiplying factor of the converter. Thus the output voltage from converter 91 varies in accordance with variations of the detector signal and is amplified, the degree of amplification or gain being adjustable by varying the contrast control signal. Higher amplification increases contrast in the image enabling better perception of slight differences in density between adjoining regions of the subject. Lower amplification and less contrast may be preferable where pronounced density differences are present such as in medical x-rays which depict both bony structures and soft tissue.

Multiplying digital to analog converter 91 multiplies the voltage received from amplifier 88 by a fraction in the range from 0 to 1 that is determined by the digital input from bus 86. To provide further amplification, the output of converter 91 is connected to the inputs of each of four voltage amplifiers 92a, 92b, 92c and 92d which have progressively greater gains. The output of each amplifier 92a, 92b, 92c and 92d is coupled to a separate input of a multiplexer 93 (an AD7502 manufactured by Analog Devices) which enables the central processing unit 38 to route the detector output signal through any selected one of the amplifiers depending on the degree of contrast that has been selected by the operator or by the program. The output of multiplexer 93 is converted to a sequence of image data bytes which encode density variations in the subject at successive stages of the scan.

In the above described detector circuit 43, multiplying digital to analog converter 91 functions as a fine gain control while amplifiers 92 and multiplexer 93 operate as a coarse gain control. The circuit 43 operates in accordance with the following equation:

$$V_o = C \times (V_i + B) \times n/255$$

where $V_o$ is the voltage at the output of multiplexer 93;

C is the coarse gain provided by selection of one of the amplifiers 92 and which in this example can be 1, 10, 100 or 1000;

$V_i$ is the voltage applied to one input of adding amplifier 88 by preamplifier 89;

B is the voltage applied to the other input of adding amplifier 88 by converter 84.

n is the digital value applied to digital to analog converter 91 through bus 86 and which in the present embodiment may be any integer between 0 and 255 to select the fine component of the gain.

Using the above specific parameters, which are presented for purposes of example and may be varied in other embodiments, the circuit 43 functions as a video amplifier with a continuous dynamic range of 0.1 to 1000.

The variations of the output voltage of multiplexer 93 are encoded in a serial sequence of image data bytes by an analog to digital converter 94. The digitized data are transmitted through the interface 47 where the bytes are packaged and, in one mode of operation, sent to the buffer storage 44 of video board 46 for storage at successive x-y addresses in response to successive clock pulses from the divider 59 of FIG. 6A. The image at display monitor 33 is created by reading out the stored data bytes from successive addresses in sequence.

The video board 46 may be of the known type which produces a standard television signal format such as RS-170 (as used for home television sets) or RS-343 (which provides greater resolution). In this example of the invention, the board 46 is a PCVISION-Plus Display Board manufactured by Imaging Technology, Inc., Woburn, Mass., U.S.A. Such a video board 46 provides a signal to the monitor 33 which encodes the horizontal and vertical sync and also provides an intensity signal voltage which varies in accordance with the values encoded by successive ones of the data bytes. If psuedocolor is used, such boards 46 also transmit three signals that vary in accordance with the red, green and blue values encoded by the data bytes as translated by a built in color lookup table (LUT). The data is transmitted to monitor 33 and is read out independently of any data transfers by the computer to and from the buffer storage 44 of the video board 46.

Thus a second raster scan is established at the display monitor screen that is similar in configuration to the first raster scan at the x-ray source 12 but not necessarily of the same size. The luminosity of successive points or pixels in the second raster scan varies in accordance with the values encoded by successive ones of the image data bytes and thus the monitor 33 displays the desired radiographic image.

In an alternate mode of operation which can be initiated at the keyboard, the central processing unit 38 does not transmit the image data directly to video board 46. With reference to FIGS. 6A and 6C in particular, the digitized serial image data bytes from analog to digital converter 94 are stored at successive x-y addresses in the CPU memory 48. This enables operator selection of any of several forms of digital data processing to alter characteristics of the image prior to transfer of the data to video board 46 for display in the previously described manner.

Specific forms of standard image data processing which are enabled by the program listing which accompanies this specification include colorization based on gray levels, field flattening, edge enhancement, image subtraction, histogram equalization and stretching or compression of contrast in the image. The program can be extended to enable still other types of digital data processing if desired.

In the preferred form of the invention and as implemented in the program listing, the central processing unit 38 can be used for automatic control of image brightness and contrast in order to obtain images of uniform quality. With reference to the previously given equation which governs the operation of the detector circuit 43, unit 38 initially sets the brightness or offset factor B at zero, the coarse gain factor C at one or unity gain and the factor n at the maximum value which is 255 in this example by applying the corresponding digital values to converter 87, multiplexer 93 and converter 91. At the end of the first raster scan, which is done at the lowest resolution and the greatest scan speed to minimize radiation exposure, the highest and lowest image data byte values are identified. The central processing unit 38 then readjusts the digital values that are applied to converter 87, multiplexer 93 and converter 91 to cause a detector signal voltage corresponding to the highest identified image data byte value to produce the maximum output available at analog to digital converter 94 and to cause a detector signal voltage corresponding to the lowest identified byte value to produce the minimum output at the converter 94. This autoranging process maximizes contrast in the image and is repeated to provide continual fine tuning of brightness and contrast.

Referring to FIGS. 6B in particular, components of the electron gun 14 of x-ray tube 12 include a cathode heating filament 96, an electron emissive cathode 97, a control grid 98 for varying electron beam current and a focusing grid 99 for causing the beam to impact the tube anode plate 18 at a single minute point at any given time. Referring jointly to FIGS. 6A and 6B, in order to control tube voltages and currents in response to operator selection at the keyboard or in response to instructions in the program, central processing unit 38 generates four sets of digital signals which are respectively encoded to identify the desired magnitudes of the high voltage at cathode 97, filament 96 current, control grid 98 voltage and electron beam current. The x-ray machine I/O board, interface 47, transmits the signals to a digital to analog converter 102 through a control data bus 100. At converter 102 each set of signals is converted to an analog voltage of corresponding magnitude and applied to a separate one of four output channels 101a, 101b, 101c and 101d of the converter. In the present example, the four channel converter 102 is an AD390 manufactured by Analog Devices.

Referring in particular to FIG. 6B which depicts the tube control module 19, the cathode voltage signal from converter output channel 101a is applied to the input of a high voltage supply 103 where it is amplified and transmitted to the cathode 97. The present example of the invention utilizes an RMP 125N300X1941 High Voltage Supply manufactured by Spellman Co., Plainview, N.Y., U.S.A.

The voltage from converter output 101b that determines filament current is amplified by amplifier 104 and applied to the input stage 106 of a first optical coupler 107. Optical coupler 107 may be of the known form having an input stage 106 that produces light having a frequency proportional to the amplitude of the input voltage and a light transmissive fiber optic intermediate stage 109 through which the optical signal is transmitted to an output stage 110 where it is reconverted to a voltage having the magnitude identified by the light frequency.

The high voltage regions of the apparatus are situated within a conductive metal enclosure, indicated by dashed line 111 in FIG. 6B, which is insulated from external structures and which is electrically coupled to the output of high voltage supply 103. The enclosure 111 serves as a virtual chassis ground for electrical components that are within the high voltage region. Optical coupler 107 and the other optical couplers to be described enable the transmission of control signals into the high voltage region by means that do not create a conductive path for direct current between the high and low voltage regions of the system. In the present example of the inventions stages 106, 109 and 110 of the optical couplers such as 107 are respectively an MFOE76 Opto Emitter, an ESKA SH4001 Opto Cable and an MFOD71 Opto Detector manufactured by Motorola, Inc., Austin, Tex., U.S.A.

The output voltage of optical coupler 107 is applied to a power amplifier 112 and the tube filament 96 is connected between the output of the amplifier and enclosure 111. Thus the filament 96 is heated by a current having a magnitude that is determined by the control signal voltage at the output of coupler 107.

The focusing grid 99 voltage that is needed to focus the electron beam at anode plate 18 is dependent on the voltage difference between cathode 97 and the grounded anode plate. The focusing grid 99 voltage should be increased a proportionate amount when cathode voltage is increased and should be reduced when the cathode voltage is lowered. This is accomplished automatically in the present embodiment. High voltage supply 103 is of the type which has a first monitoring output line 113 that provides a relatively low monitoring signal voltage that is proportional to the high voltage that is currently being delivered by the supply. The monitoring signal voltage is amplified at a low voltage region amplifier 114 that is coupled to the input of a high voltage region amplifier 115 through another optical coupler 116. The output of amplifier 115 is connected to the focusing grid 99. Thus variation of the high voltage which is being applied to the x-ray tube 12, for the purpose of varying x-ray energy, is automatically accompanied by a voltage change at grid 99 that maintains beam focus at anode plate 18.

Control grid 98 regulates electron beam current. A control grid 98 voltage that is sufficiently negative relative to the voltage at cathode 97 suppresses the electron beam. Shifting the control grid voltage in the positive direction progressively increases electron beam current and therefore x-ray production. Increases in the high voltage at cathode 97 also act to increase beam current independently of the control grid 98 voltage. The present system automatically compensates for changes in cathode 97 voltage in order to maintain the beam current which has been selected by the operator at the keyboard or by instructions in the program.

For this purpose, the control grid voltage control signal from converter 102 output 101*c* (FIG. 6A) is amplified at amplifier 118 and applied to the positive input of a differential amplifier 119 through another optical coupler 121. The output of differential amplifier 119 is coupled to the control grid 98 through a voltage amplifier 122. The control signal which is applied to the positive input of differential amplifier 119 has a negative magnitude when the electron beam is to be suppressed and fixes a maximum control grid voltage when the electron beam is to be generated. Variation of control grid voltage between these extremes, to maintain the beam current that has been called for by the operator or by the program, is effected by varying the voltage that is applied to the negative input of differential amplifier 119 which voltage is subtracted from the voltage at the positive input by the amplifier.

In particular, the beam current signal from converter 102 output 101*d* (FIG. 6A) is applied to the negative input of another differential amplifier 123 which has an output coupled to the negative input of differential amplifier 119 through another optical coupler 124. Thus amplifier 119 applies a voltage to control grid 98 that is less than the above discussed maximum value by an amount determined by the beam current control signal which is received at the negative input of the amplifier.

Differential amplifier 123 enables automatic maintenance of the selected beam current when the high voltage at cathode 97 is changed. The high voltage supply 103 has a second monitoring signal line 126 that provides a voltage that is proportional to the current which the supply provides to the x-ray tube 12 and which is therefore proportional to electron beam current. The current monitoring line 126 is connected to the positive input of differential amplifier 123. Thus an increase in beam current brought about by an increase in the high voltage increases the output voltage from amplifier 123. This reduces the output voltage of amplifier 119 and therefore the control grid voltage since the amplifier 119 subtracts the voltage at its negative input from the voltage at its positive input. For similar reasons, an incremental decrease in beam current resulting from reduction of the high voltage causes an increase in control grid voltage that restores the beam current to the magnitude called for by the current control signal.

Operating power for the electronic components within the high voltage enclosure 111 is provided by a D.C. power supply 127 having a chassis ground connection 128 to the enclosure and positive and negative output terminals 129 and 131 respectively. Alternating current for energizing the power supply 127 is transmitted into the high voltage region through an isolation transformer 132.

Referring jointly to FIGS. 6A and 6B, malfunction of the x-sweep frequency generator 24 portion of the circuit or the y-sweep frequency generator portion 26 or both could cause tube damage in the absence of corrective measures. If the electron beam is not scanning regularly or evenly or scans too slowly, a localized area of anode plate 18 could be overheated. The previously described high voltage supply 103 is of a type which ceases to generate high voltage in response to receipt of a D.C. control signal. The control signal in the present embodiment is produced by an error detector 133 which monitors the currents that are transmitted to beam deflection yoke 28 and which applies the disabling control signal to the high voltage supply 103 if either current is absent or of insufficient magnitude to avoid tube damage. Error detector 133 will be hereinafter described in more detail.

Referring again to FIG. 1, reduction of the size of the raster pattern at x-ray source 12 as depicted at 22*a* acts to concentrate the heating effect of the electron beam 17 at a reduced area of anode plate 18. Anode damage from overheating is prevented by utilizing the previously described digital controls to reduce electron beam current as the size of the raster scan pattern is reduced and preferably to a degree that is at least approximately proportional to the size of the raster scan pattern area reduction. This is accomplished automatically in the present embodiment by instructions contained in the program.

The program enables operator initiation of each of the modes of operation described above by input from the keyboard 41 and also enables each of the described automatic control functions that involve digital control signals.

FIG. 8 is a flowchart diagram which facilitates understanding of the programmed procedure for acquiring magnified high resolution images of areas in a full sized image that have been selected as being of particular interest, such as the areas 49, 49*a* and 49*b* as shown in FIG. 2.

With reference to block 134 of FIG. 8, image data for each area of interest 49, 49*a* and 49*b* are acquired and stored during separate raster scans at the x-ray source 12. The area may be selected by the operator at the beginning of each image acquisition or may be entered into a table of scan sequences to be executed by the central processing unit 38. If the vertical size of the scan is set equal to the horizontal size, a square area will be imaged. Rectangular areas having other vertical to horizontal aspect ratios may also be selected.

With reference to block 136, the four digital to analog converters 66, 69, 77 and 81 are then loaded from the central processing unit 38 to establish the pan (horizontal shift of the raster scan), scroll (vertical shift of the raster scan), zoom (magnification) for the first area of interest scan and a divisor is provided to the clock output divider 59 from the central processing unit 38 to establish scan speed. With reference to block 137, the scan is then started. With reference to block 138, the image data from the detector signal is copied to respective locations or addresses in the video display board buffer storage 44 as the raster scan proceeds. With reference to block 139, the scanning sequence stops at the end of the raster scan if no more area scans have been requested. Otherwise, the sequence returns to block 134 and the process continues looping until all requested area scans are completed at block 139.

One example of the use of area of interest scanning is in the inspection of solder joints in printed circuit boards. Only the areas of the board which contain the devices that have solder joints need be inspected. Their locations can be entered into a table of addresses to be stored and accessed by the computer.

In an alternate mode of operation, which is implemented by the program and made possible by the x-max and y-max registers 61*a* and 71*a*, one or more areas of interest are selected in an original image that may be obtained at high scanning speed. Thereafter, only the areas of interest are periodically rescanned at slower speeds for such purposes as image averaging or to detect motion while other portions of the image remain as originally acquired. This enables viewing of high clarity and updated depictions of the areas of interest against a background of the original image without rescannings of the entire image.

The areas are selected from an original image in the same manner as described above. Referring to block 136 of FIG. 8 and to FIG. 6A, The digital to analog converters 69 and 81 are then loaded from the central processing unit 38 in the previously described manner to establish the pan (horizontal shift of the raster scan) and scroll (vertical shift of the raster scan). In addition, x-max register 61a and y-max register 73a are loaded to establish the horizontal pixel count and vertical pixel count. The values stored in the step resisters 62 and 74 and in digital to analog converters 66 and 67 (the zoom registers) are left unchanged. Thus rescannings of the selected areas of interest have the same pixel spacing, resolution and aspect ratio as the original image and thus exactly overlay the original image on the display terminal screen.

In some usages of the apparatus 11 it is desirable to define the area of interest 49 by entering a set of densities or gray levels that appear in the initial full sized image. In medical or dental x-rays, for example, the relatively dense bone structures or teeth may be the subject of interest rather than adjacent soft tissue.

In this procedure, which is implemented by the previously referred to program listing, the operator enters a selected gray level and a selected zoom value for an area of interest scan at the keyboard 41. The central processing unit 38 then does a full sized raster scan and analyzes the stored image data to locate an image pixel value that meets the entered gray level criterion. At this point, the pan and scroll values for rescanning the area that surrounds the raster address of the located pixel value, at the entered zoom value, are generated by the central processing unit 38 and a zoomed image is obtained in the previously described manner. An alternate procedure, which could be substituted into the program if desired, is to analyze the incoming serial image data during the initial full sized scan and then terminate the initial scan immediately when a pixel meeting the entered gray level criterion is detected. This would, on the average, speed the procedure and reduce radiation exposure of the subject in instances where there is only one area of interest that meets the gray level criteria.

The capability of making virtually instant changes in the operating parameters of the x-ray tube 12 together with the above described capability of identifying predetermined gray levels in the image data enables tracking of a moving area of interest 49 by the system. This can facilitate a variety of x-ray imaging operations. For example blurring of medical and dental x-rays by patient motion is a common problem. As another example, the medical procedure called electrophysiology involves movement of catheters to various locations within the human heart to monitor electrical signals associated with activities of the cardiac muscle. In this procedure, it is important to know the locations of the catheter sensors at all times as they are collecting vital data used for diagnosing the patients disease. Another application is monitoring of the flow of contrast media which has been injected into an artery during an angiographic procedure. The location information obtained during these operations can be stored for later analysis.

Another example of use of this type of area of interest scanning is the locating of clots in a blood vessel relative to the location of a catheter. A moving catheter can be tracked by using its gray level to define a first area of interest and the blood clot location gray level can be used to define a second area of interest. Only those two areas of interest are scanned thereby increasing speed and reducing radiation exposure of the subject.

The tracking procedure, which is implemented by the program listing, is depicted in the flowchart diagrams of FIGS. 9 and 10. With reference to block 141, the operator selects and enters the gray level criterion and the value for the zoom area that is to be imaged around the first location at which that gray level is encountered in the image data during an initial scan. The operator also enters a loop count value that determines the number of times that the search for the gray level will be repeated if the gray level has not been found during the prior searches. As indicated at block 142, the tracking process is then started and at block 143 the raster area is zoomed to full size. At the next block 144 the central processing unit checks to see if the loop count currently has a value greater than zero and in that event proceeds to block 146. If the loop count is zero, the tracking procedure is terminated.

With reference to block 146, the initial full sized image is acquired and the loop count is reduced by a count of one. At the next block 147 the search for the trigger gray level value is begun. If the trigger value is not found, the next block 148 selects the path back to block 143 and the process is repeated until the trigger gray level value is detected or until the loop count has been reduced to zero.

Upon detection of the gray level value, block 145 selects the path to block 149 at which raster size is reduced in accordance with the operator entered instruction and the raster scan area is shifted at the anode plate to be centered at the x and y axis location at which the trigger gray level was detected. The program then returns to block 144 and a new image is acquired. The program continues to loop and repetitively acquire new images until the loop count has been reduced to zero at block 144. If scanning repetition rate is sufficiently rapid, such as 16 raster scans per second for example, the image of a moving object at the display screen appears stationary.

Many different procedures may be used to perform the search, at block 147, for the operator entered gray levels of interest. The procedure of the present example is depicted in the flowchart of FIG. 10 and performs a center to outside search. Referring to block 151, the first search begins at the raster scan line $y_o$ where $y_o$ is the center of the search region defined by the operator selected zoom area ($y_o = y_{max}/2$). The first offset or vertical displacement value for the raster scan ($y_{off}$) is 0. As indicated at block 152, the first x pixel is at x=0. With reference to block 153, the first pixel gray level is sampled and if it is less than the gray level trigger value the next pixel at x=x+step is than $x_{max}$ at block 155. In the latter case the y value sampled at block 154. The process repeats until either the trigger value is found at block 154 or x is greater becomes y=$y_{off}$ step at block 156. If y is less than $y_{max}$ at block 157 the path returns to block 152 and the process repeats until either the trigger gray level value is found at block 158 or y becomes greater than $y_{max}$. If the latter occurs than the trigger value has not been found as indicated at block 159. This corresponds to the situation at block 148 of FIG. 9 and the tracking loop repeats at block 143 of FIG. 9.

Imaging of a moving object in the above described manner can cause an apparent elongation of the object in the image, the elongation being in the direction of the motion and being proportional to the velocity of the object. The effect is more pronounced when the object moves in the y-axis direction due to the lower frequency of the y sweep signal relative to the x sweep signal. This distortion may be eliminated by using the previously described aspect ratio controls to reduce the aspect ratio of the raster scan area at the x-ray source in the direction of the object movement and by an amount proportional to object velocity.

A further advantage of selectable gray level triggering is reduction of x-ray dosage as radiation is concentrated at areas of interest and is not wasted on high resolution imaging of areas that are not of interest.

Referring again to FIG. 6B, a low value resistor 161x is connected in series relationship with the x-axis beam deflection coil 71 and a similar resistor 161y is in series relationship with the y-axis beam deflection coil 82. The voltage drops across resistors 161x and 161y vary in accordance with variations of the x and y sweep frequency signals and provide x and y sweep frequency monitoring signals to the sweep frequency error detection circuit 133 at terminals 162x and 162y respectively.

A suitable detailed circuit for the error detection circuit 133 is depicted in FIG. 11. As previously described, the high voltage supply 103 is of a type which turns off in response to a D.C. signal which will be herein termed the sweep error signal. Circuit 133 applies the error signal to the high voltage supply in response to an absence of either or both of the x and y sweep frequency signals or to irregularities in the waveforms of the sweep signals thereby preventing heat damage to the anode plate of the x-ray source and also preventing acquiring of distorted images. The circuit 133 also prevents acquisition of erroneous image data from an abnormal raster scanning.

For this purpose, the x sweep frequency monitoring signal is amplified by connecting the previously described terminal 162x to the positive or non-inverting input of an operational amplifier 163 which amplifier has a negative or inverting input connected to ground through a resistor 164 and which has a feedback resistor 166 that determines the gain. Referring to FIG. 12, waveform 167a depicts the variation of the x-sweep monitoring signal voltage as a function of time and for purposes of illustration is shown as a defective sweep signal which is to be detected by the error detection circuit. In particular, the defective waveform 167a of this example has flattened or truncated peaks 168.

The output of amplifier 163 is coupled to the inverting input of a second amplifier 169 through a resistor 171 and capacitor 172 which are connected in series. A resistor 173 and parallel capacitor 174 provide a feedback circuit for amplifier 169 and the non-inverting input of the amplifier is connected to ground through another resistor 176. Capacitor 172 causes amplifier 169 to operate as a differentiator. Thus, as shown at waveform 167b in FIG. 12, the output voltage from amplifier 169 varies as a function of the rate of change of the output voltage from amplifier 163.

Referring jointly to FIGS. 11 and 12, the differeniated waveform 167b drops from a high level to a low level during the relative brief retrace intervals T1 to T2 and reverts to the high level during the following line scan interval T2 to T4 except that in the present example the flattened peak 168 causes the differentiated waveform to dwell at an intermediate level for a period T2 to T3 before returning to the high level. This dwell forms a window in the waveform that is detected by circuit 133.

The window detection portion of the circuit includes an AND gate 177 of the known form which has first and second inputs 178 and 179 and at which the output voltage is at a high state when high state voltages are present at both inputs and drops to a low value if the voltage at either input is low. The output voltage from differentiating amplifier 169 is applied to the non-inverting input of another amplifier 182 which has an inverting input connected to ground through a resistor 183 and a feedback circuit defined by a resistor 184 and parallel capacitor 186. The output of amplifier 182 is applied to the negative input of a first comparator amplifier 187 and to the positive input of a second comparator amplifier 188. The output of the first comparator 187 is connected to first input 178 of the AND gate 177 and the output of the second comparator 188 connects to the second AND gate input 179. Amplifier 182 functions to adjust the amplitude range of the differentiated waveform 167b to match the range of comparators 187 and 188.

Comparator 187 functions to detect whether the output from amplifier 182 is above or below a particular level indicated by dashed line V1 which is superimposed on waveform 167b in FIG. 12. The second comparator 188 detects whether the amplifier 182 output is above or below a lower level indicated by dashed line V0 in the drawing. The levels V1 and V0 are preferably selectable to enable selection of the degree of sensitivity of the circuit to sweep signal irregularities.

For this purpose, a resistor 189 and potentiometer 191 are connected in series relationship between the D.C. power supply (not shown) and ground and the junction between the two is connected to the reference voltage input of first comparator 187. Thus the reference voltage and therefore the voltage level V1 can be varied by adjustment of the potentiometer 191. Another resistor 192 and potentiometer 193 are connected in series between the power supply and ground to provide a selectable reference voltage to the second comparator 188 to enable variation of voltage level V0. The power supply applies +15 volts to resistor 189 and −15 volts to resistor 192 in this example although other values may be appropriate in other systems.

First comparator 187 compares the differentiated waveform 167b, as transmitted through amplifier 182, with the selected reference voltage at the positive input of the comparator and the output of the comparator is low during periods when the waveform voltage is equal to or exceeds the reference voltage and is high when the waveform voltage is lower than the reference voltage. Thus, as depicted at waveform 167c, the output of comparator 187 is high during the retrace period T1 to T2 and continues to be high during the following period T2 to T3 during which the irregularity 168 is present in the sweep signal. The comparator 187 output reverts to a low state during the following period T3 to T4.

As depicted at waveform 167d, the output of the second comparator 188 goes low during the retrace period T1 to T2 and is high at other times. Consequently, as depicted at waveform 167e, the output of AND gate 177 goes high during the periods T2 to T3 and is otherwise low as both comparator outputs are simultaneously high only during those periods.

In the absence of a sweep signal irregularity such as flattened peak 168, the output of AND gate 177 remains continuously low as the output of first comparator 187 goes high only during the retrace periods T1 to T2 and the output of the second comparator 188 goes high only during the intervening periods T2 to T4. Thus the presence of cyclical voltage pulses at the output of the gate 177, as depicted in waveform 167e, is indicative of an irregularity in the x-sweep frequency signal. In the total absence of the sweep signal, the output of the gate 177 becomes continuously high.

The output of AND gate 177 is connected to ground through a resistor 196, a circuit junction 197 and a capacitor 198. As depicted in waveform 167f, the output pulses from gate 177 that are indicative of sweep error charge capacitor 198. Normal leakage causes the charge to decrease somewhat during the intervals T3 to T4 when the gate 177 is disabled but the recurring pulses maintain the charge at an elevated level.

Another comparator 201 monitors capacitor 198 and responds to charging of the capacitor by outputting the error signal which disables the high voltage supply 103. This suppresses the electron beam in the x-ray source and stops x-ray generation.

For the foregoing purpose, the positive input of comparator 201 is connected to capacitor 198 at circuit junction 197. A selectable reference voltage is applied to the negative input of comparator 201 through another potentiometer 202 which enables adjustment of the level of charge that is required to trigger the comparator. The output of comparator 201 is applied to the high voltage supply 103 through one input of an OR gate 199 when the comparator senses that the voltage on capacitor 198 equals or exceeds the selected reference voltage is received from potentiometer 202.

The y sweep frequency error detection circuit 203 is connected between the previously described terminal 162y and the other input of OR gate 199 and is not shown in detail as it may be similar to the above described x-sweep frequency error detection circuit except insofar as it cycles at the slower y sweep frequency.

The sweep error detection circuit 133 is capable of disabling high voltage supply 103 when necessary independently of the central processing unit 38 and the programming. Preferably, the error signals at the output of OR gate 199 are also transmitted to CPU 38. In accordance with the program, the central processing unit 38 responds to the error signal by turning off the sweep frequency signals, filament current, and control grid and focussing grid voltages at the x-ray source through the hereinbefore described control components. This also enables display of a sweep frequency error warning at the operator's display terminal.

While the invention has been described with respect to a particular embodiment for purposes of example, many modifications and variations are possible and it is not intended to limit the invention except as defined in the following claims.

We claim:

1. X-ray image data generating apparatus having an x-ray source which includes an anode plate, means for directing an electron beam to said plate to produce x-rays at an x-ray origin point on said plate and means for traveling said x-ray origin point in a raster scanning motion within a raster scan area on said plate in response to an x-axis sweep frequency signal and a y-axis sweep frequency signal, said apparatus further having an x-ray detector which produces a detector signal that is indicative of variations of x-ray intensity at a detection point that is spaced apart from said anode plate, means for producing a first sequence of digital data bytes which encode successive values indicative of variations in the magnitude of said x-sweep frequency signal that are to occur during the course of the raster scanning motion at said raster area, means for producing a second sequence of digital data bytes which encode successive values indicative of variations in the magnitude of said y-sweep frequency signal that are to occur during the course of said raster scanning motion at said raster area, means for producing said x-sweep frequency signal and said y-sweep frequency signal during the course of said raster scanning at said raster scan area by conversion of the values encoded by successive data bytes of said first and second sequences thereof into analog signals wherein the improvement comprises:

digital data processing means for producing any of a plurality of different digital control signals for said x-ray image data generating apparatus including digitized sweep frequency control signals, and scanning control means for modifying at least one characteristic of at least one of said x-sweep frequency signal and said y-sweep frequency in response to said digitized sweep frequency control signals.

2. The apparatus of claim 1 further including a computer memory, means for producing a third sequence of digital data bytes which encode values indicative of variations of said detector signal and means for storing said first, second and third sequences of digital data bytes in said computer memory.

3. The apparatus of claim 1 wherein said scanning control means enables scan speed control by varying the repetition rate of said data bytes of said said first and second sequences thereof.

4. The apparatus of claim 1 wherein said scanning control means enables resolution control by varying the number of said data bytes in said first and second sequences thereof.

5. The apparatus of claim 1 further including means for producing zoom signal data bytes which encode values indicative of a selected size for said raster scan area, and wherein said scanning control means varies the amplitude ranges of said x-sweep frequency signal and said y-sweep frequency signal in response to changes of said values encoded by said zoom signal data bytes.

6. The apparatus of claim 1 wherein said scanning control means enables variation of the number of data bytes in said first and second sequences thereof whereby the aspect ratio of said raster scan area may be varied.

7. The apparatus of claim 1 further including means for producing a third sequence of data bytes which encode values indicative of variations of said detector signal, means for producing a contrast control signal data byte which encodes a value indicative of a selected degree of contrast which is to be exhibited by said image, means for increasing and decreasing differences between the values encoded by successive ones of said data bytes of said third sequence thereof in response to changes in the value encoded by said contrast control signal data byte.

8. The apparatus of claim 1 wherein said means for directing an electron beam to said anode plate of said x-ray source includes an electron gun having a filament, an electron emissive cathode that is heated by said filament, a control grid and a focusing electrode disposed in spaced apart relationship to generate and control said electron beam and wherein a negative high voltage supply is connected to said cathode, further including:

means for producing electron gun control signals in the form of digital data bytes which encode values for filament current, cathode voltage and control grid voltage and wherein each of said values may be varied, and electron gun control means for applying current to said filament and voltages to said cathode and control grid that are determined by said values which are encoded by said digital electron gun control signals.

9. The apparatus of claim 1 further including means for producing area of interest digital values which encode the location of a selected portion of said raster scan area and wherein said scanning control means reduces the size of said raster scan area at said anode plate in response to a zoom signal and positions the reduced raster scan area at a location on said anode plate that corresponds to the location that is encoded by said area of interest digital values.

10. The apparatus of claim 1 further including means for producing a sweep frequency voltage error signal in response to an absence of either or both of said x-axis and y-axis sweep frequency signals and means for suppressing application of said high voltage to said anode plate in response to said error signal.

11. The apparatus of claim 1 further including:

an analog to digital signal converter having an input which receives said detector signal and an output which transmits a sequence of digital data bytes encoding values indicative of changes in the magnitude of said detector signal and wherein said converter can produce a range of values that is bounded by a maximum value and a minimum value, means for detecting the highest and lowest values encoded by said sequence of data bytes during a first raster scan of said anode plate, and means for adjusting the amplitude range of said detector signal to cause said highest value to produce said maximum value at said converter output during a rescanning of said anode plate and to cause said lowest value to produce said minimum value at said converter output during said rescanning whereby contrast in said image is automatically optimized.

12. A method for producing radiographic image data by x-ray scanning of a subject which includes the steps of:

scanning an electron beam in a first raster pattern on an anode plate to produce a moving x-ray origin point, generating said radiographic image data by detecting x-rays at a detection point situated at the opposite side of said subject from said anode plate and by producing a detector output signal that vary in accordance with variations of x-ray intensity at said detection point, selecting an area within said first raster pattern for magnification, encoding the location of the selected area of said first raster pattern in digital signals and initiating a zoom signal, reducing the size of said first raster pattern in response to said zoom signal to provide a smaller second raster pattern, and positioning the smaller second raster pattern at a location on said anode plate that corresponds to the location that is encoded in the digital signals.

13. A method of obtaining radiographic image data by x-ray scanning of a subject which includes the steps of:

producing x-rays at an x-ray origin point on an anode plate of an x-ray tube by directing an electron beam to said anode plate, traveling said x-ray origin point in a raster scanning motion within a raster scan area on said anode plate by applying an x-axis sweep frequency signal and a y-axis sweep frequency signal to said x-ray tube, generating said radiographic image data by detecting x-rays at a detection point situated at the opposite side of said subject from said x-ray origin point and producing a detector signal that is indicative of variations of x-ray intensity at said detection point as said x-ray origin point moves to successive locations in said raster scan area, producing a first sequence of digital data bytes which encode successive values indicative of variations in the magnitude of said x-sweep frequency signal that are to occur during the course of said raster scanning motion at said raster scan area, producing a second sequence of digital data bytes which encode successive values indicative of variations in the magnitude of said y-sweep frequency signal that are to occur during the course of said raster scanning motion at said raster scan area, modulating the magnitudes of said x-sweep frequency signal and said y-sweep frequency signal during the course of said raster scanning at said first raster scan area by reference to the values encoded by successive data bytes of said first and second sequences thereof, and modifying at least one of said x-sweep frequency signal and said y-sweep frequency signal by modifying the values that are encoded by at least one of said first and second sequences of data bytes.

* * * * *